US012799992B2

(12) United States Patent
Liu et al.

(10) Patent No.: US 12,799,992 B2
(45) Date of Patent: Nov. 17, 2026

(54) BRAKE MECHANISM, AND LIFTING COLUMN USING BRAKE MECHANISM

(71) Applicant: CHANGZHOU KAIDI ELECTRICAL INC., Changzhou (CN)

(72) Inventors: Tao Liu, Changzhou (CN); Gengxing Zhu, Changzhou (CN); Zhenbin Gong, Changzhou (CN); Jindong Xu, Changzhou (CN)

(73) Assignee: CHANGZHOU KAIDI ELECTRICAL INC., Changzhou (CN)

( * ) Notice: Subject to any disclaimer, the term of this patent is extended or adjusted under 35 U.S.C. 154(b) by 0 days.

(21) Appl. No.: 18/941,760

(22) Filed: Nov. 8, 2024

(65) Prior Publication Data

US 2025/0067311 A1 Feb. 27, 2025

Related U.S. Application Data

(63) Continuation of application No. PCT/CN2023/106652, filed on Jul. 10, 2023, and a
(Continued)

(30) Foreign Application Priority Data

May 11, 2022 (CN) ......................... 202210507129.6
May 11, 2022 (CN) ......................... 202221136897.7

(51) Int. Cl.
*F16D 59/00* (2006.01)
*F16H 25/24* (2006.01)
*F16D 121/16* (2012.01)

(52) U.S. Cl.
CPC ......... *F16D 59/00* (2013.01); *F16H 25/2454* (2013.01); *F16D 2121/16* (2013.01); *F16H 2025/2463* (2013.01)

(58) Field of Classification Search
CPC ... F16D 59/00; A47B 9/04; A47B 2200/0057; F16H 25/2454
See application file for complete search history.

(56) References Cited

U.S. PATENT DOCUMENTS

2006/0279143 A1 12/2006 Platz et al.
2015/0337930 A1 11/2015 Tseng
(Continued)

FOREIGN PATENT DOCUMENTS

CN 101910680 A 12/2010
CN 203036148 U 7/2013
(Continued)

OTHER PUBLICATIONS

International Search Report (ISR1) dated Oct. 19, 2023, issued in corresponding International Patent Application No. PCT/CN2023/106658.
(Continued)

*Primary Examiner* — Randell J Krug

(57) ABSTRACT

A braking mechanism used in a lifting column comprises a connecting component, a mounting seat, and a self-locking spring. The connecting component includes a first spline portion, a stepped portion, an intermediate connection portion, and a second spline portion, arranged sequentially along an axis. The second spline portion and the intermediate connection portion pass through the mounting seat. The stepped portion contacts an end face of the mounting seat. The self-locking spring is mounted on the intermediate connection portion. An end of the self-locking spring is fixed to the mounting seat.

22 Claims, 21 Drawing Sheets

Related U.S. Application Data continuation of application No. PCT/CN2023/106658, filed on Jul. 10, 2023.

(56) References Cited

U.S. PATENT DOCUMENTS

| | | | | |
|---|---|---|---|---|
| 2018/0177288 | A1 | 6/2018 | Lin | |
| 2025/0169602 | A1 * | 5/2025 | Clausen | G01P 21/00 |

FOREIGN PATENT DOCUMENTS

| | | | | | |
|---|---|---|---|---|---|
| CN | 207659000 | U | | 7/2018 | |
| CN | 208532163 | U | | 2/2019 | |
| CN | 209100418 | U | * | 7/2019 | |
| CN | 110107620 | A | * | 8/2019 | F16D 65/52 |
| CN | 209621790 | U | * | 11/2019 | |
| CN | 209925545 | U | | 1/2020 | |
| CN | 110778673 | A | | 2/2020 | |
| CN | 210265590 | U | | 4/2020 | |
| CN | 111608524 | A | | 9/2020 | |
| CN | 212878226 | U | * | 4/2021 | |
| CN | 215521832 | U | | 1/2022 | |
| CN | 114607744 | A | | 6/2022 | |
| CN | 217682931 | U | | 10/2022 | |

OTHER PUBLICATIONS

International Search Report (ISR2) dated Oct. 23, 2023, issued in corresponding International Patent Application No. PCT/CN2023/106652.

* cited by examiner

BRAKE MECHANISM, AND LIFTING COLUMN USING BRAKE MECHANISM

CROSS-REFERENCE TO RELATED APPLICATIONS

This application is a continuation application of the following applications, each of which is incorporated by reference herein in its entirety: (i) PCT Patent Application No. PCT/CN2023/106658, entitled "BRAKE MECHANISM, AND LIFTING COLUMN USING BRAKE MECHANISM" filed on Jul. 10, 2023, which claims priority to Chinese Patent Application No. 202221136897.7, filed with the State Intellectual Property Office of the People's Republic of China on May 11, 2022, and entitled "BRAKE MECHANISM, AND LIFTING COLUMN USING BRAKE MECHANISM" and (ii) PCT Patent Application No. PCT/CN2023/106652, entitled "EASY INSTALLATION BRAKE MECHANISM, AND LIFTING COLUMN USING BRAKE MECHANISM" filed on Jul. 10, 2023, which claims priority to Chinese Patent Application No. 202210507129.6, filed with the State Intellectual Property Office of the People's Republic of China on May 11, 2022, and entitled "EASY INSTALLATION BRAKE MECHANISM, AND LIFTING COLUMN USING BRAKE MECHANISM."

TECHNICAL FIELD

This application relates generally to lifting columns, and in particular, to brake mechanisms and lift columns that use the brake mechanisms.

BACKGROUND

An automatic height-adjustable desk typically uses electricity as its power source. It can use a motor to control a mechanical system to adjust height of the desk. Alternatively, it can use a compressor to control a pneumatic rod or a hydraulic rod system to adjust height of the desk. This type of desks is available in both single-column and dual-column designs, and its height adjustment can be done through both remote and manual controls. In particular, the height adjustment is accomplished by lifting columns of the desk. In existing technology, lifting columns encounter several technical issues, such as unstable elevation, wobbling, and jamming. Some lifting columns operate at relatively slow lifting speeds. Moreover, in practical use, lifting columns require a reliable self-locking mechanism to prevent unintended sliding. Currently, braking mechanisms of lifting columns are structurally complex and difficult to install. Some braking mechanisms expand in size with the increase in their gravities, and their bidirectional friction resistance can reduce the performance of driving motors.

For example, Chinese Patent No. CN210265590U discloses a friction self-locking mechanism of a lifting column that includes a friction component and a connecting component. The friction component and the connecting component are positioned on an inner side and an outer side of a drive box of the lifting column, respectively. A driving end is axially fixed by the friction component and the connecting component, such that the driving end is rotatably assembled with the drive box of the lifting column. The friction component contacts the outer side of the drive box, thereby generating friction for self-locking. The drawback of this application is that the friction increases with an increase in the gravity of the lifting column. Additionally, since the friction resistance is bidirectional, it can reduce the performance of driving motor(s).

For another example, Chinese Patent No. CN208532163U discloses a transmission device that includes a hollow shaft. Within the hollow shaft, a transmission screw is positioned, along with a first brake torsion spring that brakes the transmission screw and a second brake torsion spring that brakes the hollow shaft. The drawback is of this application that the structure is relatively complex and difficult to install. It provides unidirectional friction. However, it is challenging to achieve similar resistance values for both lifting columns when the transmission is turned on, which results in wobbling or shaking.

For yet another example, Chinese Patent No. CN212878226U discloses a rotary shaft locking mechanism that includes a locking assembly and a rotary shaft. The locking assembly is positioned on the rotary shaft. The locking assembly includes a stopper and a torsion spring. The torsion spring is mounted on a cylindrical surface at an end of the rotary shaft, and the stopper restrains an end of the torsion spring. The drawback is of this application that the structure is relatively complex and difficult to install. It provides unidirectional friction. However, it is challenging to achieve similar resistance values for both lifting columns when the transmission is turned on, which results in wobbling or shaking.

The technical problems that need to be addressed are listed as follows. First, when two or more lifting columns are turned on, uneven lifting resistance from lifting columns causes the automatic height-adjustable desk to wobble or shake. Second, the resistance of existing friction structures increases proportionally with the load, resulting in excessive loss in the efficiency of driving motors. Third, existing braking mechanisms require installation from two directions on their housings, making it difficult to check whether those brake mechanisms are properly installed. Fourth, vibrations of the driving motors is transmitted to lifting columns via connecting components, which results in amplified vibrations.

SUMMARY

The technical problem that this application aims to solve is to overcome the deficiencies in existing technology and provide a braking mechanism (e.g., an easy-to-install braking mechanism).

In one aspect of the application, a braking mechanism comprises a connecting component, a mounting seat, and a first friction component. The connecting component includes a first spline portion, a stepped portion, an intermediate connection portion, and a second spline portion, arranged sequentially along an axis. The second spline portion and the intermediate connection portion pass through the mounting seat. The stepped portion contacts an end face of the mounting seat. The first friction component is mounted on the intermediate connecting portion, the first friction component is directly or indirectly fixed to the mounting seat, and the first friction component does not rotate circumferentially relative to the connecting component. In particular, the connecting component is implemented to facilitate connection with the first friction component and the mounting seat, ensuring that the first friction component does not rotate circumferentially relative to the connecting component, thereby providing a braking effect.

In some embodiments, the braking mechanism further includes a self-locking spring. The self-locking spring is mounted on the intermediate connection portion, and an end of the self-locking spring is fixed to the mounting seat. In particular, the self-locking spring is implemented to improve self-locking performance of the connecting component and the mounting seat.

In some embodiments, the mounting seat includes a plurality of peripheral walls and a limiting groove. The limiting groove is formed by a space between two peripheral walls of the plurality of peripheral walls. The self-locking spring includes an end protruding radially outward. The end of the self-locking spring is inserted into the limiting groove. In particular, this configuration is implemented to ensure that the self-locking spring remains stationary relative to the mounting seat.

In some embodiments, the mounting seat includes a plurality of peripheral walls, and at least one of the plurality of peripheral walls has a groove. The first friction component includes an outer ring. The outer ring has a boss, and the boss is inserted into the groove. In particular, the engagement of the boss and the groove facilitates the connection between the mounting seat and the first friction component.

In some embodiments, the groove includes a first side wall and a second side wall. Each of the first side wall and the second side wall has a spring clip and a clearance hole. During insertion of the boss into the groove, the respective spring clip is compressed into the respective clearance hole and, after the boss passes the respective spring clip, the respective spring clip is reset, such that the first friction component is fixed to the mounting seat. In particular, the spring clips and clearance holes of the first and second side walls are implemented to further reinforce the connection between the mounting seat and the first friction component.

In some embodiments, the first friction component includes an inner ring. The inner ring has an extension portion and a barb at an end of the extension portion. A clamping spring is mounted on the extension portion, and the barb restrains the clamping spring on the first friction component In some embodiments, the extension portion includes notches that are spaced equally or unequally. In particular, notches are implemented to provide the first friction component with elasticity.

In some embodiments, the braking mechanism further includes an elastic component and a circlip. The clastic component and the circlip are positioned below the first friction component sequentially along the axis. The elastic component and the circlip directly or indirectly apply an axial force to the first friction component.

In some embodiments, the braking mechanism further includes a second friction plate. The second friction plate is positioned (i) between the first friction component and the self-locking spring or (ii) between the first friction component and the elastic component. The second friction plate is circumferentially fixed to the connecting component.

In some embodiments, the intermediate connection portion includes a first cylindrical section, a non-circular section, and a second cylindrical section. The first friction component and the second friction plate are mounted on the non-circular section, and a shape of an inner hole of the second friction plate corresponds to an outer contour shape of the non-circular section. The second cylindrical section includes a slot, and the circlip is positioned in the slot.

In some embodiments, a stop step is formed at a junction between the first cylindrical section and the non-circular section, and the second friction plate is axially fixed between the stop step and the first friction component.

In some embodiments, an axial length of the non-circular section is greater than a sum of a thickness of the first friction component and a thickness of the second friction plate. The axial length of the non-circular section is less than a sum of the thickness of the first friction component and twice the thickness of the second friction plate.

In some embodiments, the braking mechanism further includes a plurality of second friction plates. A first of the plurality of second friction plates is positioned between the first friction component and the self-locking spring, and a second of the plurality of second friction plates is positioned between the first friction component and the elastic component. The plurality of second friction plates are circumferentially fixed to the connecting component.

In some embodiments, the mounting seat includes four peripheral walls. A first two peripheral walls of the four peripheral walls are opposite to each other, and the first two peripheral walls include protruding edges positioned on top edges of the first two peripheral walls. A second two peripheral walls of the four peripheral walls are opposite to each other, and the second two peripheral walls include snap-fits.

In some embodiments, the second two peripheral walls that have the snap-fits include clearance grooves, and the snap-fits are positioned obliquely upward along bottom edges of the clearance grooves.

In accordance with some embodiments, a lifting column comprises an inner tube assembly, an outer tube assembly, and a braking mechanism arranged in a nested configuration. The braking mechanism can include any one or more of the features described herein. The inner tube assembly is fixed to the braking mechanism. The lifting column further includes a round tube and a threaded rod. The round tube is positioned inside the inner tube assembly. A first end of the round tube is connected to a motor assembly via the braking mechanism. A second end of the round tube is fixed to a lead screw nut, and the lead screw nut is fixed to the inner tube assembly. A first end of the threaded rod passes through the lead screw nut and is positioned inside the round tube, and a second end of the threaded rod is fixed to the outer tube assembly.

A benefit of implementing the braking mechanism and the lifting column as disclosed herein is that the friction damping generated between the mounting seat, the connecting component, and the first friction component makes the lifting resistance and lower resistance of the lifting column remain nearly consistent. This prevents wobbling or shaking caused by variations in friction damping when the lifting column is turned on. Additionally, the self-locking spring of the braking mechanism enables unidirectional self-locking, which improves the self-locking performance of the lifting column having the braking mechanism.

In another aspect of the application, a braking mechanism comprises a first connecting component, a mounting seat, and a second connecting component. The mounting seat includes an inner circle wall encircling at least a portion of the second connecting component. A portion of the first connecting component is inserted into the inner circle wall and connects to the second connecting component, forming an integrated unit that is configured to be installed into a housing. The mounting seat remains stationary relative to the housing. The first connecting component and the second connecting component perform a synchronous circumferential rotation relative to the mounting seat.

In some embodiments, the braking mechanism further includes a fastening screw. A nut is positioned inside the second connecting component. The fastening screw passes through the first connecting component, the mounting seat, and the second connecting component in sequence, and is fixed to the nut, forming an integrated structure. In particular, the braking mechanism is fastened to form the integrated structure, making it easy to install into the housing at an end of a lifting column. This installation configuration is convenient and allows for rapid testing of the braking mechanism before assembly.

In some embodiments, the mounting seat includes a plurality of peripheral walls. At least a first one of plurality of peripheral walls has an outwardly protruding edge, and at least a second one of the plurality of peripheral walls has a snap-fit. The housing includes an assembly hole that is adapted to connect to an outer contour shape of the plurality of peripheral walls. After the snap-fit is compressed and inserted into the assembly hole, the snap-fit is reset and clamped with the housing. In particular, the implementation of the plurality of peripheral walls ensures the stability of the mounting seat after installation. The outwardly protruding edge facilitates positioning, and the snap-fit allows for further fastening after installation. Additionally, the assembly hole makes it easier to connect the first connecting component and the second connecting component.

In some embodiments, the mounting seat includes four peripheral walls. A first two peripheral walls of the four peripheral walls are opposite to each other, and the first two peripheral walls include outwardly protruding edges positioned on top edges of the two of the four peripheral walls. A second two peripheral walls of the four peripheral walls are opposite to each other, and the second two peripheral walls include snap-fits.

In some embodiments, the second two peripheral walls that have the snap-fits include clearance holes, and the snap-fits are positioned obliquely upward along bottom edges of the clearance holes. After the snap-fits are compressed into the clearance holes, the snap-fits are reset and clamp the mounting seat to the housing.

In some embodiments, the first connecting component includes a spline portion, a flange portion, and an external gear ring portion. The second connecting component includes a cavity that accommodates the spline portion. The cavity includes an inner wall, and the inner wall has internal splines adapted to connect to the spline portion. The cavity includes an edge that has a flange edge. The inner circle wall of the mounting seat contacts the flange edge and the flange portion.

In some embodiments, the inner circle wall of the mounting seat includes an inner ring having a mounting hole. An inner diameter of the mounting hole is greater than an outer diameter of the spline portion. The inner diameter of the mounting hole is less than an outer diameter of the flange portion and an outer diameter of the flange edge.

In some embodiments, a groove is formed by a space between two peripheral walls of the plurality of peripheral walls. A self-locking spring is positioned at an outer wall of a cylindrical section of the second connecting component. The self-locking spring includes an end protruding radially outward. The end is inserted into the groove. In particular, the self-locking spring remains stationary relative to the mounting seat.

In some embodiments, the self-locking spring and the second connecting component have a common central axis. In particular, this configuration allows to selectively apply damping along the rotational direction between the first connecting component and the second connecting component, thereby improving the self-locking capability.

In some embodiments, the braking mechanism further includes a rubber pad. The rubber pad contacts a lower surface of the outwardly protruding edge. In particular, this configuration allows, when the braking mechanism being installed into a housing of a driving unit, the rubber pad is positioned between the braking mechanism and an inner wall of the housing for isolating vibrations from a driving unit, which prevents the vibrations from being transmitted to the lifting column.

In some embodiments, an elastic component is positioned between the fastening screw and the first connecting component. The clastic component is configured to provide bidirectional damping. In particular, the clastic component is implemented to generate bidirectional damping (e.g., generating bidirectional friction between the first connecting component, the second connecting component, and the mounting seat) to ensure that two or more lifting columns do not experience wobbling or shaking during the lifting process due to significant differences in resistance.

In some embodiments, the braking mechanism further includes a washer. The washer is positioned between the elastic component and the first connecting component.

In accordance with some embodiments, a lifting column comprises an inner tube assembly, an intermediate tube assembly, an outer tube assembly, and a driving tube arranged in a nested configuration. The lifting column further includes a housing. An end of the inner tube assembly is fixed to the housing. A drive motor and a transmission mechanism are located within the housing. A braking mechanism is located within the housing. The braking mechanism can include any one or more of the features described herein. Additionally, the transmission mechanism is connected to the first connecting component of the braking mechanism. The driving tube has a non-circular fit with the second connecting component of the braking mechanism, and the driving tube is inserted into the inner tube assembly. A hollow threaded rod assembly and a solid threaded rod assembly are positioned within the intermediate tube assembly and the outer tube assembly, respectively.

In some embodiments, the second connecting component includes an end having a spline head. The driving tube includes an end having an internal spline that is adapted to connect to the spline head. In particular, the spline head of the second connecting component is adapted to connect to the internal spline of the driving tube, which makes installation easy and effective.

In some embodiments, a hollow screw nut is installed at a tube opening of the inner tube assembly, and the hollow screw nut is threadedly mounted on the hollow threaded rod assembly. In particular, the hollow screw nut remains stationary relative to the inner tube assembly, and the hollow threaded rod assembly performs a synchronous rotation relative to the driving tube.

In some embodiments, the hollow screw nut includes a square groove. A rivet is positioned corresponding to the square groove of the hollow screw nut. In particular, the hollow screw nut is installed and positioned by stamping the rivet.

In some embodiments, the hollow screw nut includes, below the square groove of the hollow screw nut, a recess. In particular, the recess is implemented to facilitate uninstallation of the hollow screw nut.

In some embodiments, the hollow threaded rod assembly includes an end having a solid screw nut. The solid threaded rod assembly is positioned inside the hollow threaded rod assembly, and the solid threaded rod assembly is threadedly adapted to connect to the solid screw nut. In particular, the solid screw nut threads with the solid threaded rod assembly, which facilitates easy installation and effective transmission performance.

In some embodiments, an outer peripheral surface of the solid screw nut is circular, and a Hafner box is adapted to connect to the outer peripheral surface of the solid screw nut. The Hafner box includes a first Hafner component and a second Hafner component joined together, and each of the first and second Hafner components is block-shaped and has a semi-circular inner surface. In particular, the solid screw nut is positioned through the Hafner box. The Hafner box is formed by joining the first Hafner component and the second Hafner component, which makes installation easy and effective.

In some embodiments, the solid screw nut includes an outer peripheral surface having at least one oil reservoir groove. The semi-circular inner surface of each of the first and second Hafner components includes an oil reservoir half-ring. When the oil reservoir half-rings of the first and second Hafner components are assembled, a ring cavity is formed for accommodating the solid screw nut. In particular, the oil reservoir groove facilitates positioning for the installation of the solid screw nut. The oil reservoir groove also makes grease evenly distributed when the solid screw nut rotates. Additionally, the ring cavity that is formed by assembling the first and second Hafner components facilitates accommodation of the solid screw nut and enables the solid screw nut to rotate within the ring cavity. The ring cavity also prevents grease from leaking out.

In some embodiments, the Hafner box includes an outer wall having a groove. A rivet is positioned corresponding to the groove of the Hafner box. In particular, the Hafner box is positioned relative to the intermediate tube assembly through stamping the rivet.

In some embodiments, the outer tube assembly includes an end having a fixed plate. The solid threaded rod assembly includes an end that is fixed to the fixed plate. The fixed plate includes a spline hole, the solid threaded rod assembly is inserted into the outer tube assembly, and the end of the solid threaded rod assembly includes a spline adapted to connect to the spline hole. This configuration is implemented to ensure that the solid threaded rod assembly remains stationary relative to the outer tube assembly.

In some embodiments, a retaining ring is positioned between the braking mechanism and the driving tube for preventing axial movement of the self-locking spring of the braking mechanism.

Implementations of the braking mechanism and the lifting column as disclosed herein provide one or more benefits. First, the braking mechanism features modular installation, which allows for torque testing before assembly. Second, the friction damping generated between the mounting seat, the connecting component, and the first friction component makes the lifting resistance and lower resistance of the lifting column remain nearly consistent. This prevents wobbling or shaking caused by variations in friction damping when the lifting column is turned on. Third, the self-locking spring of the braking mechanism enables unidirectional self-locking, which improves the self-locking performance of the lifting column having the braking mechanism. Fourth, the implementation of the rubber pad isolates vibrations of the drive motor, preventing the vibrations from being transmitted to the lifting column. Fifth, the braking mechanism, designed as an integrated unit, can be quickly installed into the housing of the driving unit of the lifting column.

These illustrative aspects are mentioned not to limit or define the disclosure, but to provide examples to aid understanding thereof. Additional implementations are discussed in the Description of Implementations, and further description is provided there.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, mechanics, components, and units have not been described in detail so as not to unnecessarily obscure aspects of the embodiments.

Figure 1:
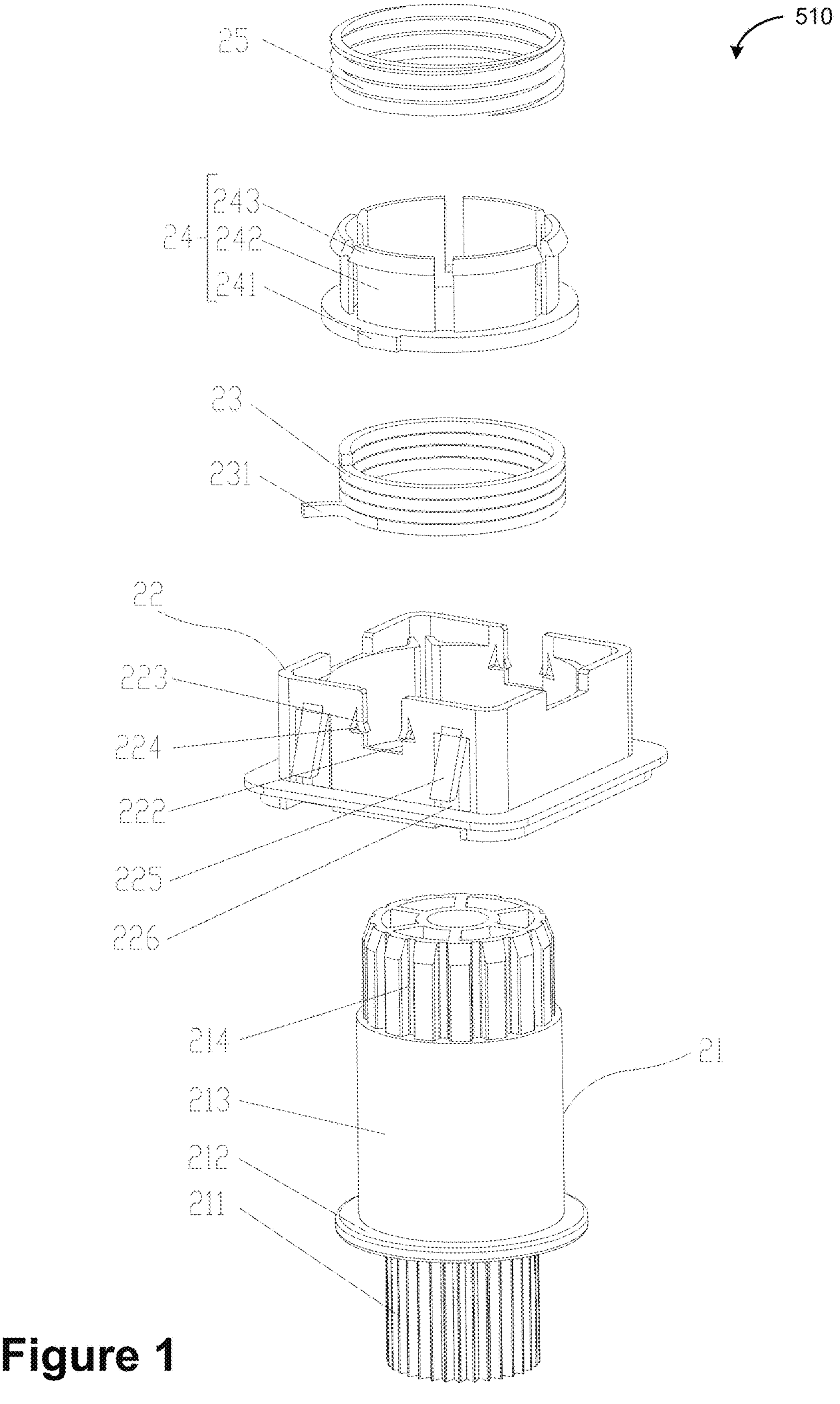
FIG. 1 illustrates an exploded view of an example braking mechanism, in accordance with some embodiments.
Figure 2:
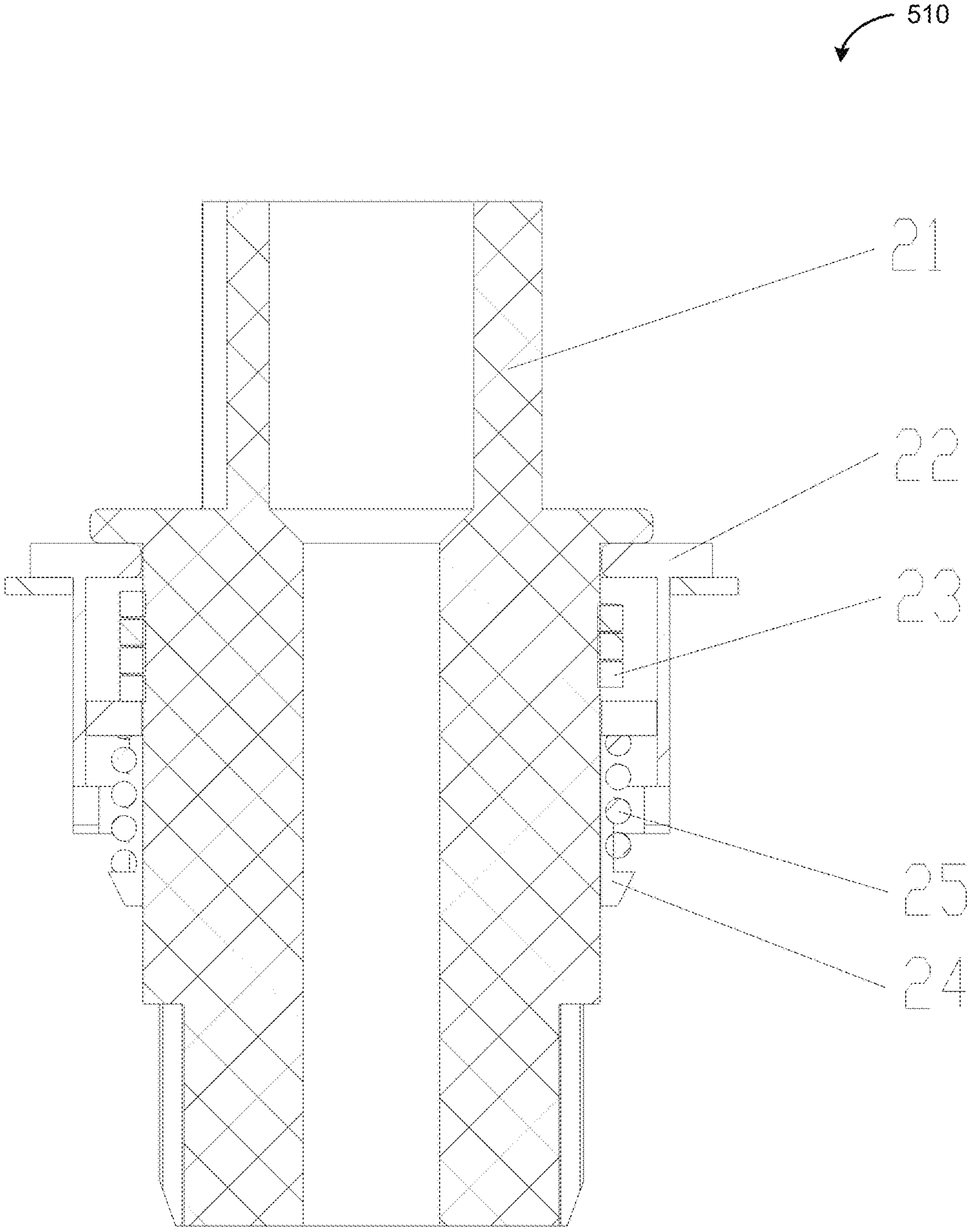
FIG. 2 illustrates a longitudinal cross-section of the example braking mechanism of FIG. 1 after being assembled, in accordance with some embodiments.

FIG. 1 illustrates an exploded view of an example braking mechanism 510, and FIG. 2 illustrates a longitudinal cross-section of the example braking mechanism 510 after being assembled, in accordance with some embodiments. As shown in FIGS. 1 and 2, the example braking mechanism 510 comprises a connecting component 21, a mounting seat 22, and a first friction component 24. The connecting component 21 includes a first spline portion 211, a stepped portion 212, an intermediate connection portion 213, and a second spline portion 214, arranged sequentially along an axis. The second spline portion 214 and the intermediate connection portion 213 pass through the mounting seat 22. The stepped portion 212 contacts end face of the mounting seat an end face of the mounting seat 22. The connecting component 21 performs a synchronous circumferential rotation relative to the mounting seat 22. The first friction component 24 is mounted on the intermediate connecting portion 213, and the first friction component 24 does not rotate circumferentially relative to the intermediate connection portion 213 of the connecting component 21. The first friction component 24 is directly or indirectly fixed to the mounting seat 22, and remains stationary relative to the mounting seat 22.

In some embodiments, the example braking mechanism 510 further includes a self-locking spring 23. The self-locking spring 23 is configured to perform unidirectional self-locking, which improves the self-locking performance of the example braking mechanism 510. The self-locking spring 23 is mounted on the intermediate connection portion 213, and an end of the self-locking spring 23 is fixed to the mounting seat 22, such that the self-locking spring 23 remains stationary relative to the mounting seat 22.

Figure 3:
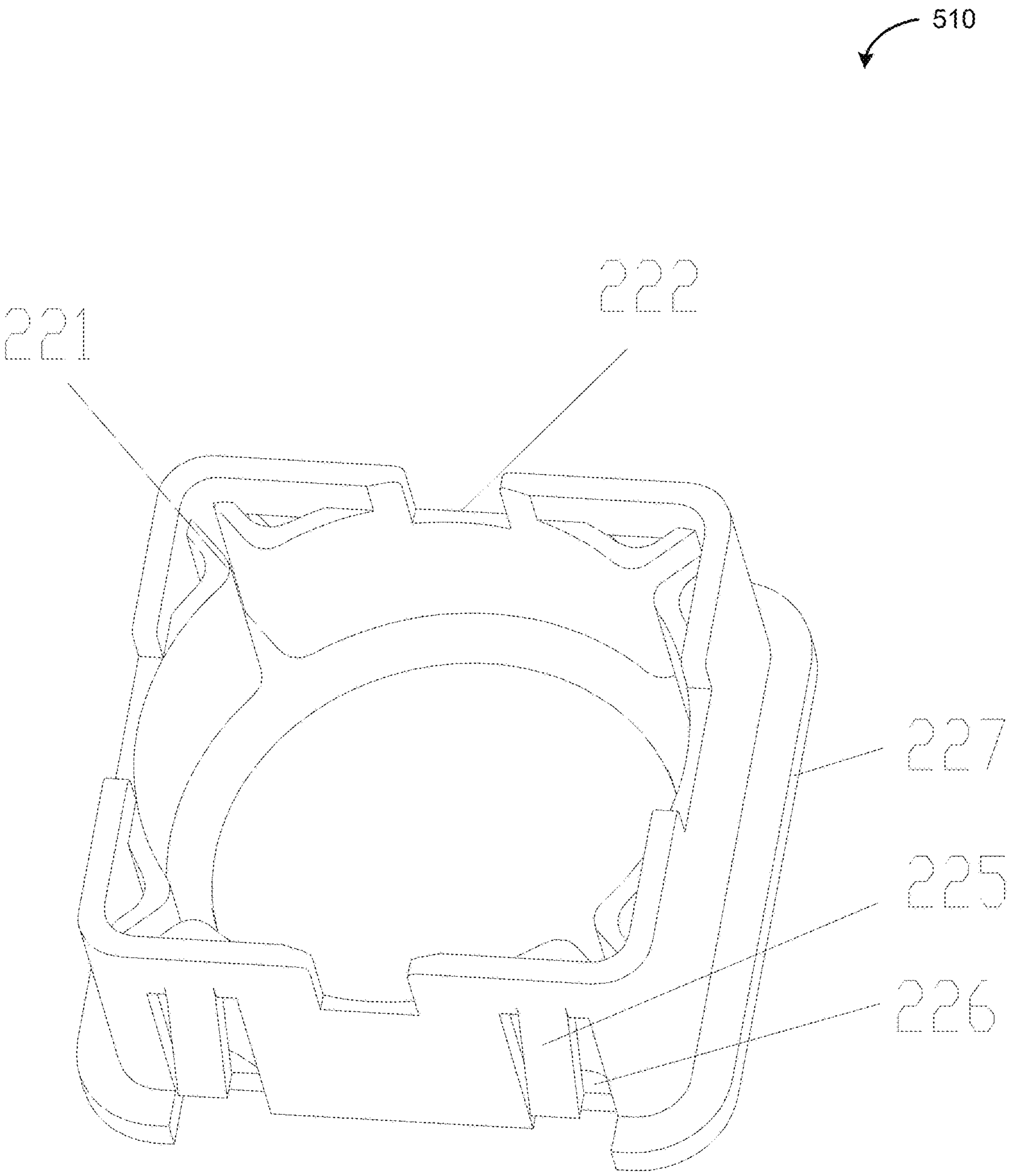
FIG. 3 illustrates a mounting seat of the example braking mechanism of FIG. 1, in accordance with some embodiments.

FIG. 3 illustrates the mounting seat 22 of the example braking mechanism 510, in accordance with some embodiments. As shown in FIG. 3, the mounting seat 22 includes a plurality of peripheral walls and a limiting groove 221 formed by a space between two peripheral walls of the plurality of peripheral walls. The self-locking spring 23 includes an end 231 protruding radially outward, the end 231 of the self-locking spring inserted into the limiting groove 221. At least a first peripheral wall of the plurality of peripheral walls of the mounting seat 22 includes a groove 222. The first friction component 24 includes an outer ring having a boss 241, the boss 241 inserted into the groove 222. In reference to FIG. 1, the groove 222 includes a first side wall and a second side wall, each of the first side wall and the second side wall having a spring clip 223 and a clearance hole 224. During insertion of the boss 241 into the groove 222, the respective spring clip 223 is compressed into the respective clearance hole 224 and, after the boss 241 passes the respective spring clip 223, the respective spring clip 223 is reset, such that the first friction component 24 is fixed to the mounting seat 22. At least a second peripheral wall of the plurality of peripheral walls of the mounting seat 22 includes snap-fits 225. The second peripheral wall that has the snap-fits 225 include clearance grooves 226, and the snap-fits 225 are positioned obliquely upward along bottom edges of the clearance grooves 226. The snap-fits 225 and the clearance grooves 226 are implemented to facilitate installation of the example braking mechanism 510 at a corresponding position on a lifting column. The plurality of peripheral walls include outwardly protruding edges 227 positioned on top edges of the plurality of peripheral walls.

Additionally, in some embodiments, the first friction component 24 includes an inner ring having an extension portion 242 and a barb 243 at an end of the extension portion. A clamping spring 25 is mounted on the extension portion 242, and the barb 243 restrains the clamping spring 25 on the first friction component 24. The extension portion 242 includes notches that are spaced equally or unequally. This makes it easier to install the first friction component 24 onto the connecting component 21.

Figure 4:
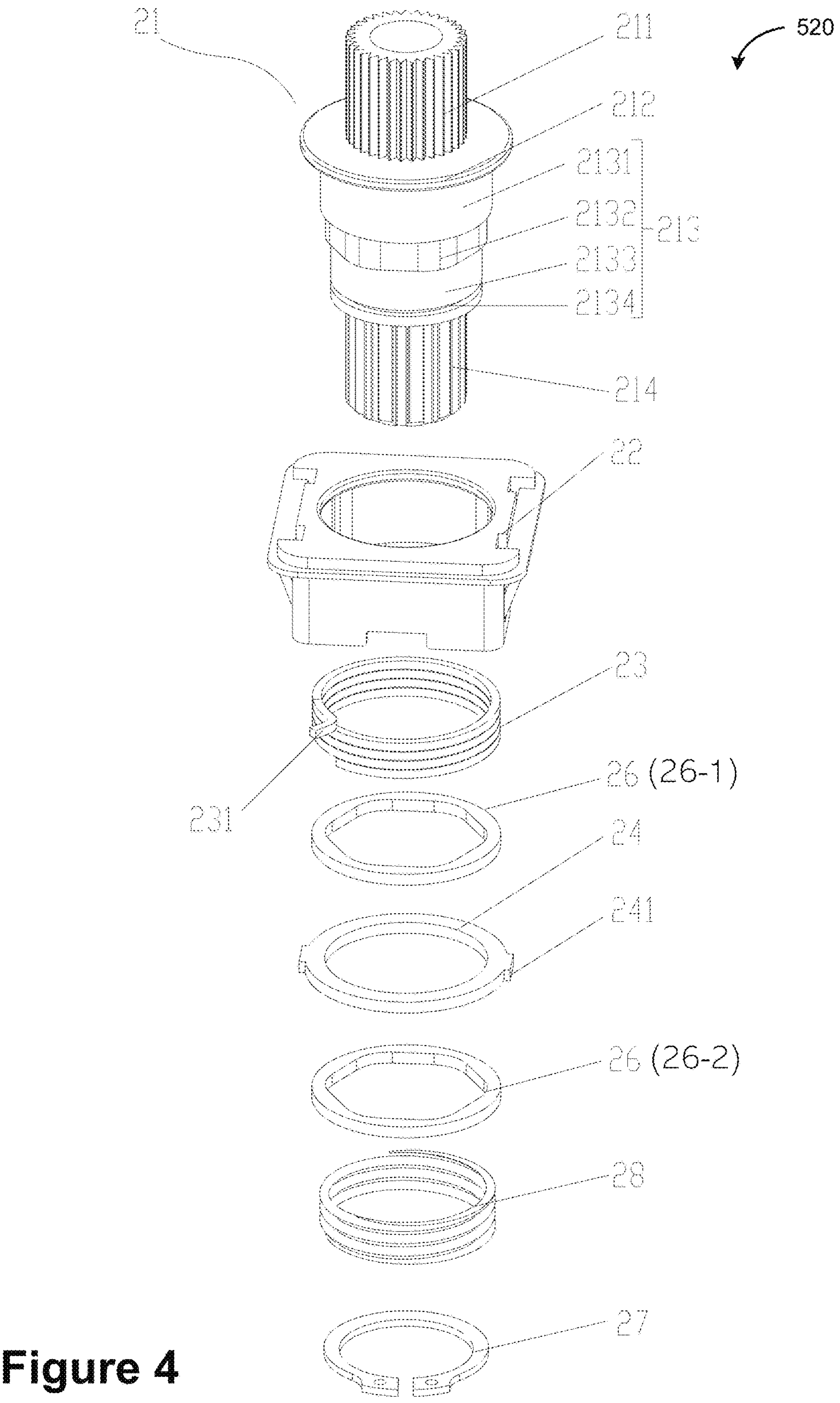
FIG. 4 illustrates an exploded view of an example braking mechanism, in accordance with some embodiments.
Figure 5:
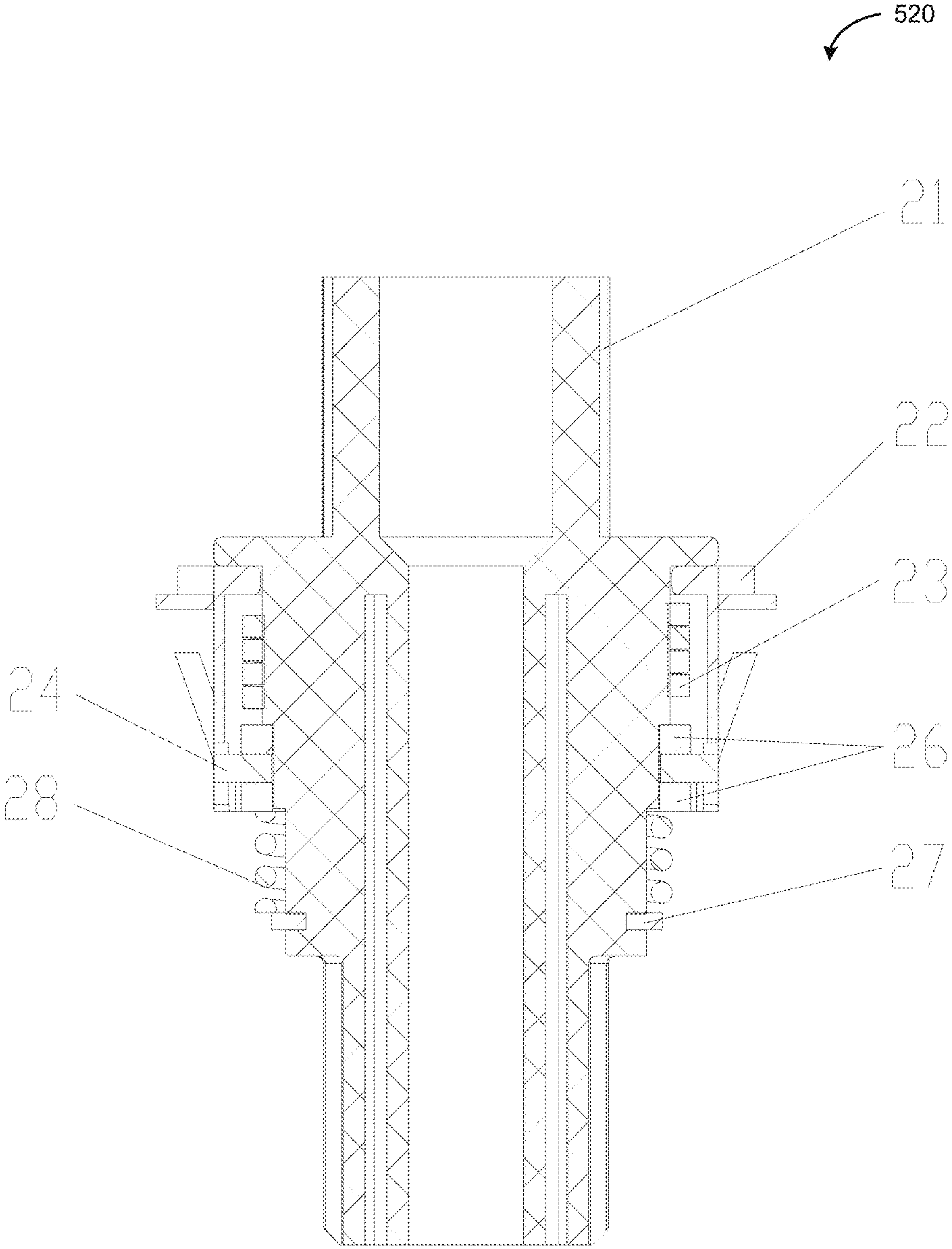
FIG. 5 illustrates a longitudinal cross-section of the example braking mechanism of FIG. 4 after being assembled, in accordance with some embodiments.

FIG. 4 illustrates an exploded view of an example braking mechanism 520, and FIG. 5 illustrates a longitudinal cross-section of the example braking mechanism 520 after being assembled, in accordance with some embodiments. In particular, the example braking mechanism 520 includes several distinct features in comparison to the example braking mechanism 510. As shown in FIGS. 4 and 5, compared with the example braking mechanism 510, a first friction component 24 of the example braking mechanism 520 docs not include an extension portion and a barb. The example braking mechanism 520 further includes an clastic component 28 and a circlip 27. The clastic component 28 and the circlip 27 are positioned below the first friction component 24 sequentially along the axis. The clastic component 28 includes a compression spring, a disc spring, a wave spring, and/or other types. The elastic component 28 and the circlip 27 directly or indirectly apply an axial force to the first friction component 24. In some embodiments, the example braking mechanism 520 further includes a second friction plate 26. The second friction plate 26 is positioned (i) between the first friction component 24 and a self-locking spring 23 of the example braking mechanism 520 or (ii) between the first friction component 24 and the clastic component 28. The second friction plate 26 is circumferentially fixed to a connecting component 21 of the example braking mechanism 520, such that the second friction plate 26 performs a synchronous rotation relative to the connecting component 21, thereby generating rotational friction between the second friction plate 26 and the first friction component 24. In some embodiments, as shown in FIG. 4, the example braking mechanism 520 further includes a plurality of second friction plates 26. A first 26-1 of the plurality of second friction plates is positioned between the first friction component 24 and the self-locking spring 23 and a second 26-2 of the plurality of second friction plates is positioned between the first friction component 24 and the elastic component 28. The plurality of second friction plates (e.g., the first 26-1 and second 26-2 of the plurality of second friction plates) are circumferentially fixed to the connecting component 21.

In some embodiments, an intermediate connection portion 213 of the connecting component 21 of the example braking mechanism 520 includes a first cylindrical section 2131, a non-circular section 2132, and a second cylindrical section 2133. The first friction component 24 and the second friction plate 26 are mounted on the non-circular section 2132, and a shape of an inner hole of the second friction plate 26 corresponds to an outer contour shape of the non-circular section 2132. The second cylindrical section 2133 includes a slot 2134, and the circlip 27 is positioned in the slot 2134.

In some embodiments, a stop step is formed at a junction between the first cylindrical section 2131 and the non-circular section 2132, and the second friction plate 26 (e.g., the first 26-1 and/or second 26-2 of the plurality of second friction plates) is axially fixed between the stop step and the first friction component 24. In some embodiments, an axial length of the non-circular section 2132 is greater than a sum of a thickness of the first friction component 24 and a thickness of the second friction plate 26 (e.g., the first 26-1 or second 26-2 of the plurality of second friction plates). The axial length of the non-circular section 2132 is less than a sum of the thickness of the first friction component 24 and twice the thickness of the second friction plate (e.g., the first 26-1 or second 26-2 of the plurality of second friction plates).

Figure 6:
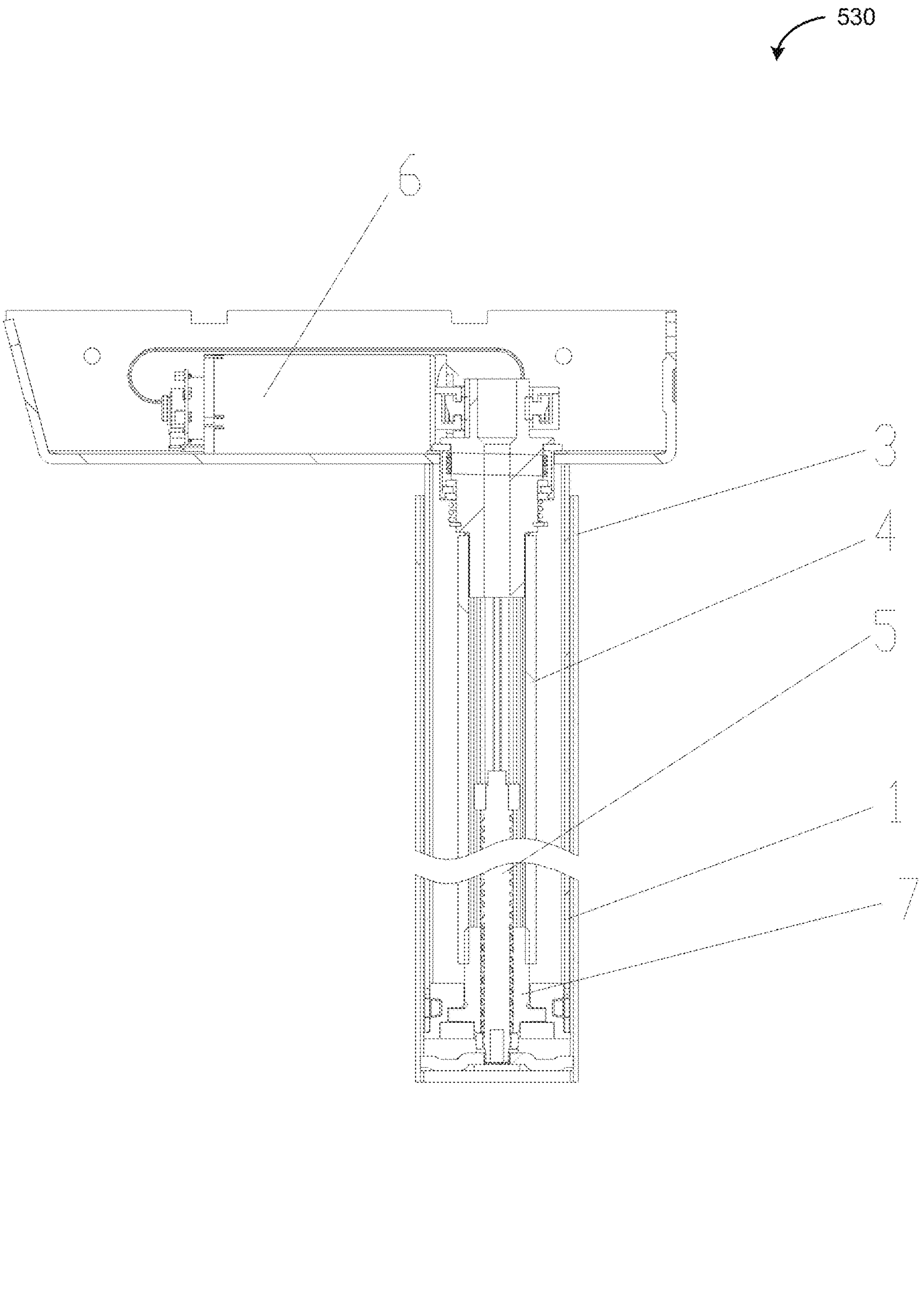
FIG. 6 is a schematic diagram illustrating an example lifting column, in accordance with some embodiments.

FIG. 6 is a schematic diagram illustrating an example lifting column 530, in accordance with some embodiments. As shown in FIG. 6, the example lifting column 530 includes an inner tube assembly 1, an outer tube assembly 3, and a braking mechanism (e.g., the example braking mechanism 510 or the example braking mechanism 520) arranged in a nested configuration. The example lifting column 530 further includes a round tube 4 and a threaded rod 5. The round tube 4 is positioned inside the inner tube assembly 1. At least a first end of the round tube 4 and a second end of the round tube 4 includes internal splines. The internal splines of the first and second ends of the round tube 4 are adapted to connect to the second spline portion 214 of the braking mechanism and an external spline of a lead screw nut 7, respectively. The first spline portion 211 of the braking mechanism is connected to a motor assembly 6. The lead screw nut 7 is positioned on the threaded rod 5 and fixed to the outer tube assembly 3. The lead screw nut 7 includes an internal thread, and the threaded rod 5 includes an external thread adapted to connect to the internal thread of the lead screw nut 7. A first end of the threaded rod 5 is positioned inside the round tube 4, and a second end of the threaded rod 5 is fixed to the outer tube assembly 3.

An assembly process of the example lifting column 530 is as follows. The lead screw nut 7 is mounted over the threaded rod 5, and the threaded rod 5 is positioned inside the round tube 4. The round tube 4 is positioned inside the inner tube assembly 1. The first end of the round tube 4 is connected to the motor assembly 6 via the braking mechanism, and the outer tube assembly 3 is mounted over the inner tube assembly 1. The second end of the round tube 4 is connected to the outer tube assembly 3.

Figure 7:
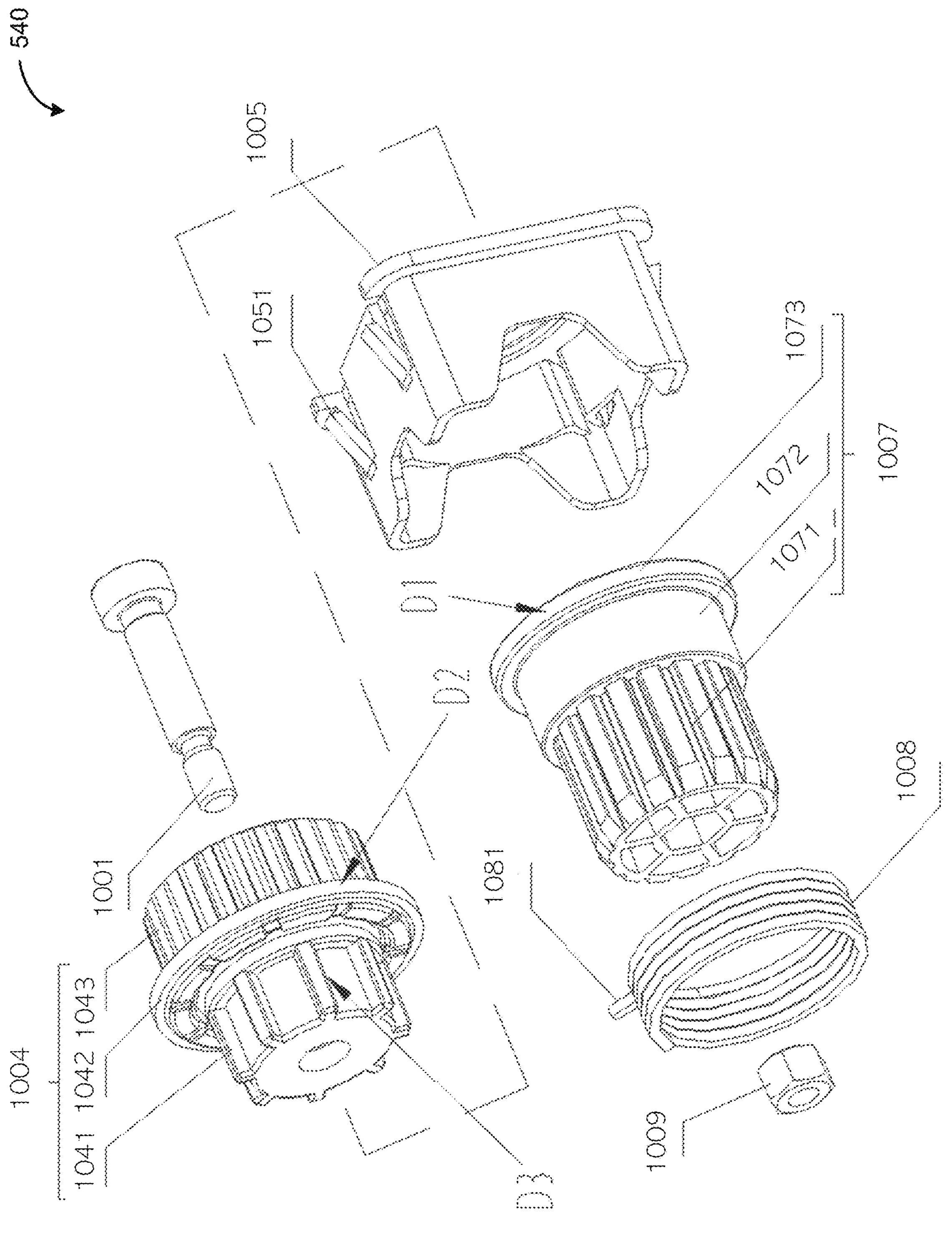
FIG. 7 illustrates an exploded view of an example braking mechanism, in accordance with some embodiments.

FIG. 7 illustrates an exploded view of an example braking mechanism 540, in accordance with some embodiments. As shown in FIG. 7, the example braking mechanism 540 comprises a first connecting component 1004, a mounting seat 1005, and a second connecting component 1007. The mounting seat 1005 includes an inner circle wall encircling at least a portion of the second connecting component 1007. A portion of the first connecting component 1004 is inserted into the inner circle wall and connects to the second connecting component 1007. The first connecting component 1004, the mounting seat 1005, and the second connecting component 1007 are axially fixed to each other, forming an integrated unit that is configured to be installed into a housing 1121. The mounting seat 1005 remains stationary relative to the housing 1121. The first connecting component 1004 and the second connecting component 1007 perform a synchronous circumferential rotation relative to the mounting seat 1005. The method for fastening and securing the first connecting component 1004, the mounting seat 1005, and the second connecting component 1007 can be achieved by using fastening screws, self-tapping screws, or other types. For example, the example braking mechanism 540 further includes a fastening screw 1001 and a nut 1009. The nut 1009 is positioned inside the second connecting component 1007. The fastening screw 1001 passes through the first connecting component 1004, the mounting seat 1005, and the second connecting component 1007 in sequence, and is fixed to the nut 1009, forming an integrated structure.

Figure 8:
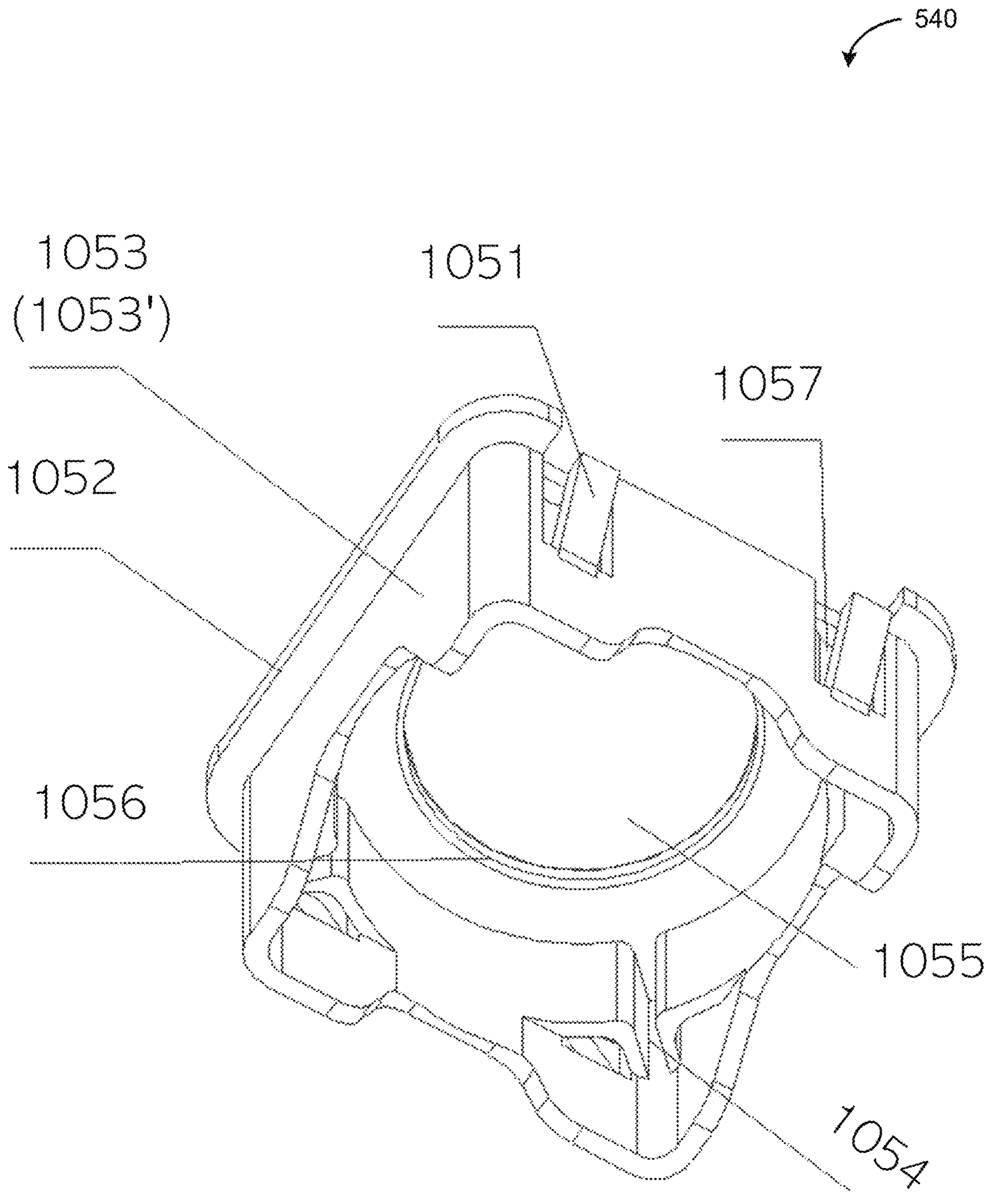
FIG. 8 illustrates a mounting seat of the example braking mechanism of FIG. 7, in accordance with some embodiments.

FIG. 8 illustrates the mounting seat 1005 of the example braking mechanism 540, in accordance with some embodiments. As shown in FIG. 7, the mounting seat 1005 includes a plurality of peripheral walls 1053. A number of the plurality of peripheral walls 1053 can vary, resulting in different outer shapes of the plurality of peripheral walls 1053, such as a quadrilateral or hexagonal shape. For example, the plurality of peripheral walls 1053 includes four peripheral walls 1053'. A first two peripheral walls of the four peripheral walls 1053' are opposite to each other, and the first two peripheral walls include outwardly protruding edges 1052 positioned on top edges of the two of the four peripheral walls 1053'. A second two peripheral walls of the four peripheral walls 1053' are opposite to each other, and the second two peripheral walls include snap-fits 1051. The second two peripheral walls that have the snap-fits 1051 include clearance holes 1057. The clearance holes 1057 include through holes or other types. The snap-fits 1051 are positioned obliquely upward along bottom edges of the clearance holes 1057. Moreover, the inner circle wall 1056 of the mounting seat 1005 includes an inner ring having a mounting hole 1055. A groove 1054 is formed by a space between two peripheral walls of the plurality of peripheral walls 1053. In reference to FIG. 7, a self-locking spring 1008 is positioned radially outward at an outer wall of the second connecting component 1007. The self-locking spring 1008 and the second connecting component 1007 have a common central axis. The self-locking spring 1008 includes an end 1081 protruding radially outward. The end 1081 is inserted into the groove 1054 of the mounting seat 1005, such that the self-locking spring 1008 remains stationary relative to the mounting seat 1005.

Figure 9:
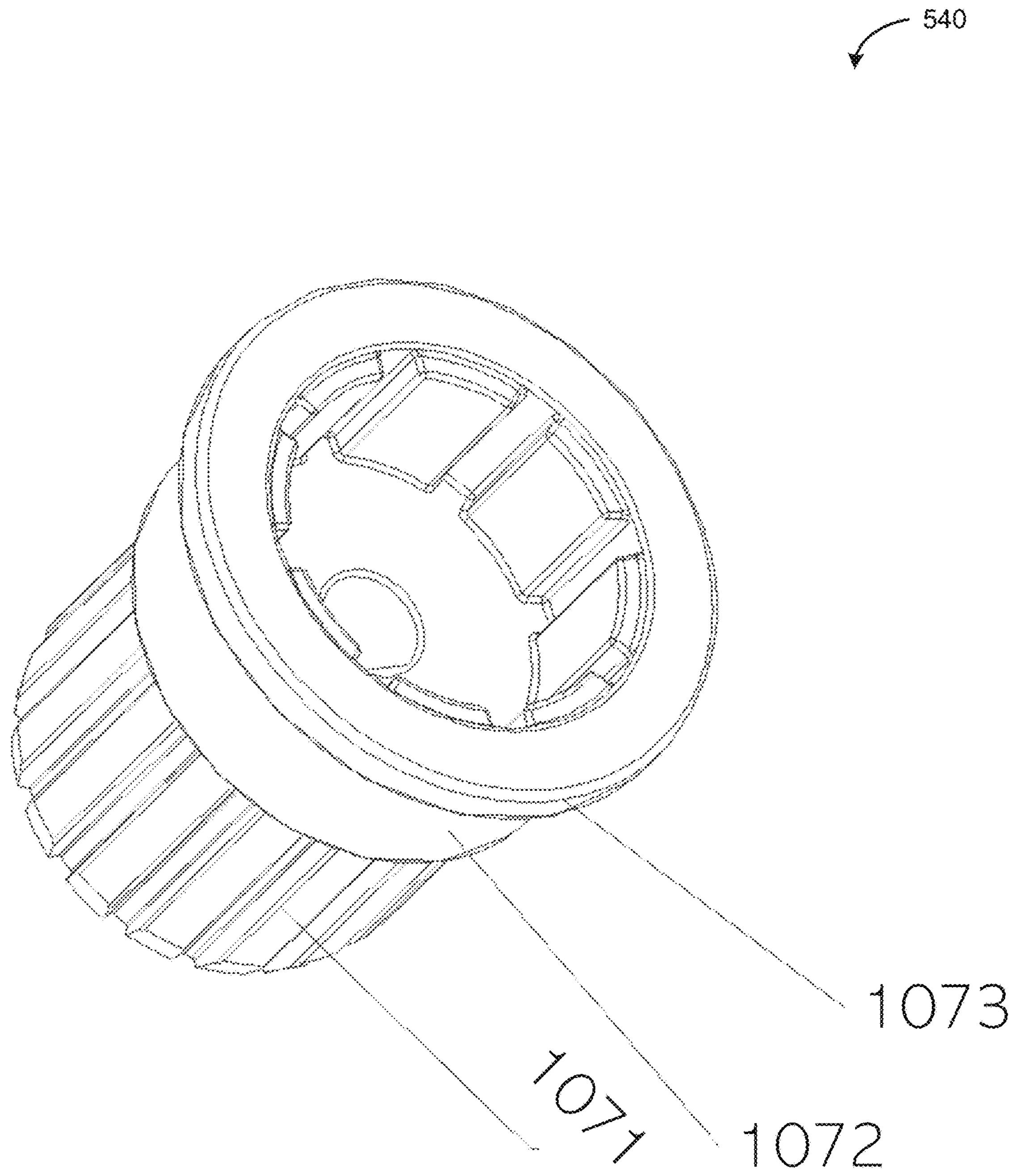
FIG. 9 illustrates a second connection component of the example braking mechanism of FIG. 7, in accordance with some embodiments.

FIG. 9 illustrates the second connection component 1007 of the example braking mechanism 540, in accordance with some embodiments. As shown in FIGS. 7 and 9, the first connecting component 1004 includes a spline portion 1041, a flange portion 1042, and an external gear ring portion 1043. The spline portion 1041 includes a through hole positioned at a bottom side of the spline portion 1041 for the fastening screw 1001 to pass through. The second connecting component 1007 includes a spline head 1071, a cylindrical section 1072, and a flange edge 1073. The spline portion 1041 of the first connecting component 1004 passes through the mounting seat 1005 and connects to the second connecting component 1007. Moreover, the second connecting component 1007 includes a cavity that accommodates the spline portion 1041, and an inner wall of the cavity has internal splines adapted to connect to the spline portion 1041. This configuration ensures that the first connecting component 1004 has a non-circular fit with the second connecting component 1007. This configuration further enables that the first connecting component 1004 and the second connecting component 1007 remains stationary relative to each other while achieving synchronous rotation. Furthermore, the inner circle wall 1056 of the mounting seat 1005 contacts the flange edge 1073 and the flange portion 1042. In particular, a plurality of protrusions are evenly distributed on a surface where the flange portion 1042 contacts the inner circle wall 1056. The plurality of protrusions are implemented to provide better cushioning. Additionally, an inner diameter of the mounting hole 1055 of the mounting seat 1005 is greater than an outer diameter of the spline portion 1041 (e.g., the label "D3" in reference to FIG. 7). The inner diameter of the mounting hole 1055 of the mounting seat 1005 is less than an outer diameter of the flange portion 1042 and an outer diameter of the flange edge 1073 (e.g., the labels "D2" and "D1" in reference to FIG. 7).

Figure 10:
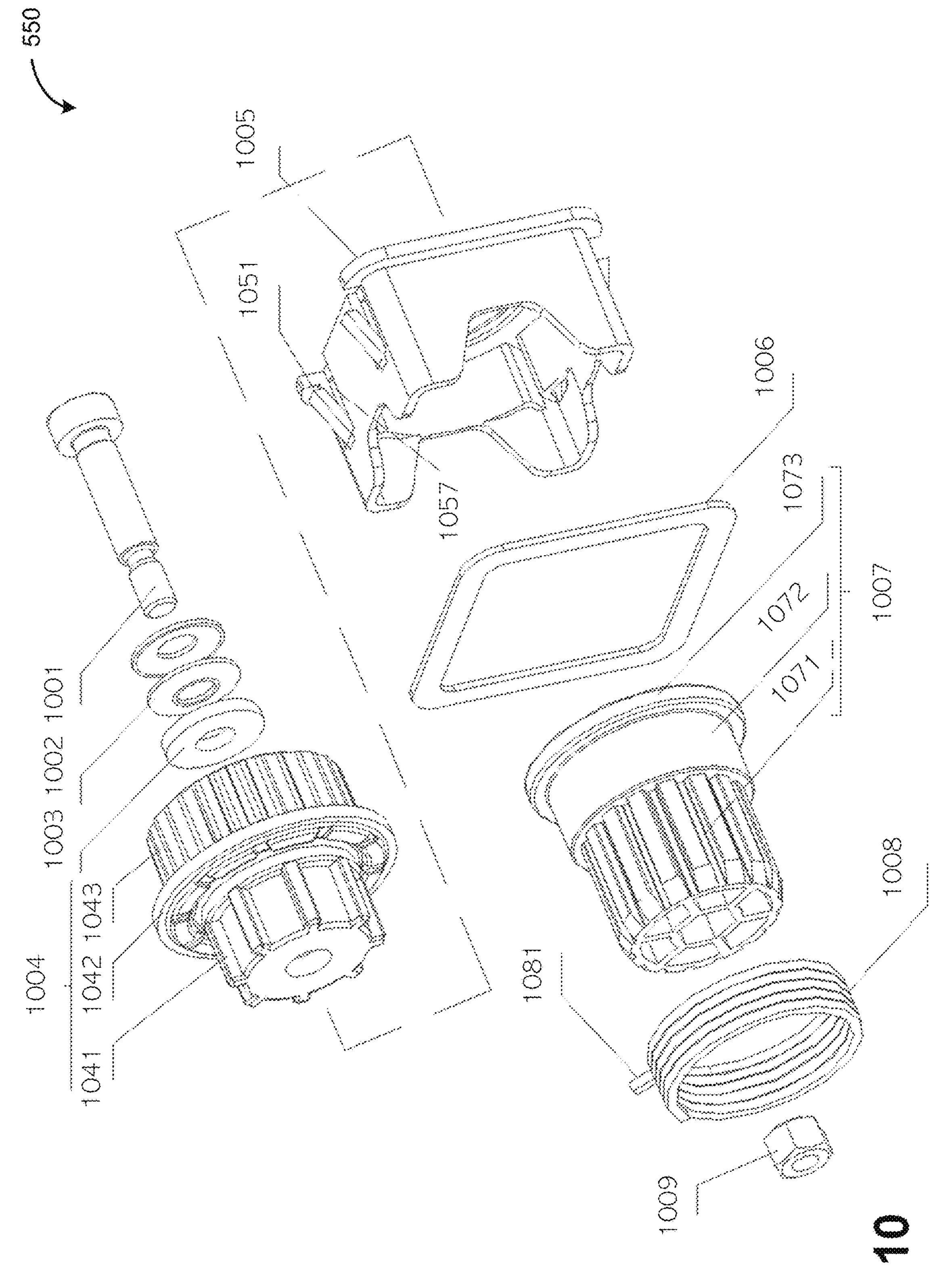
FIG. 10 illustrates an exploded view of an example braking mechanism, in accordance with some embodiments.
Figure 11:
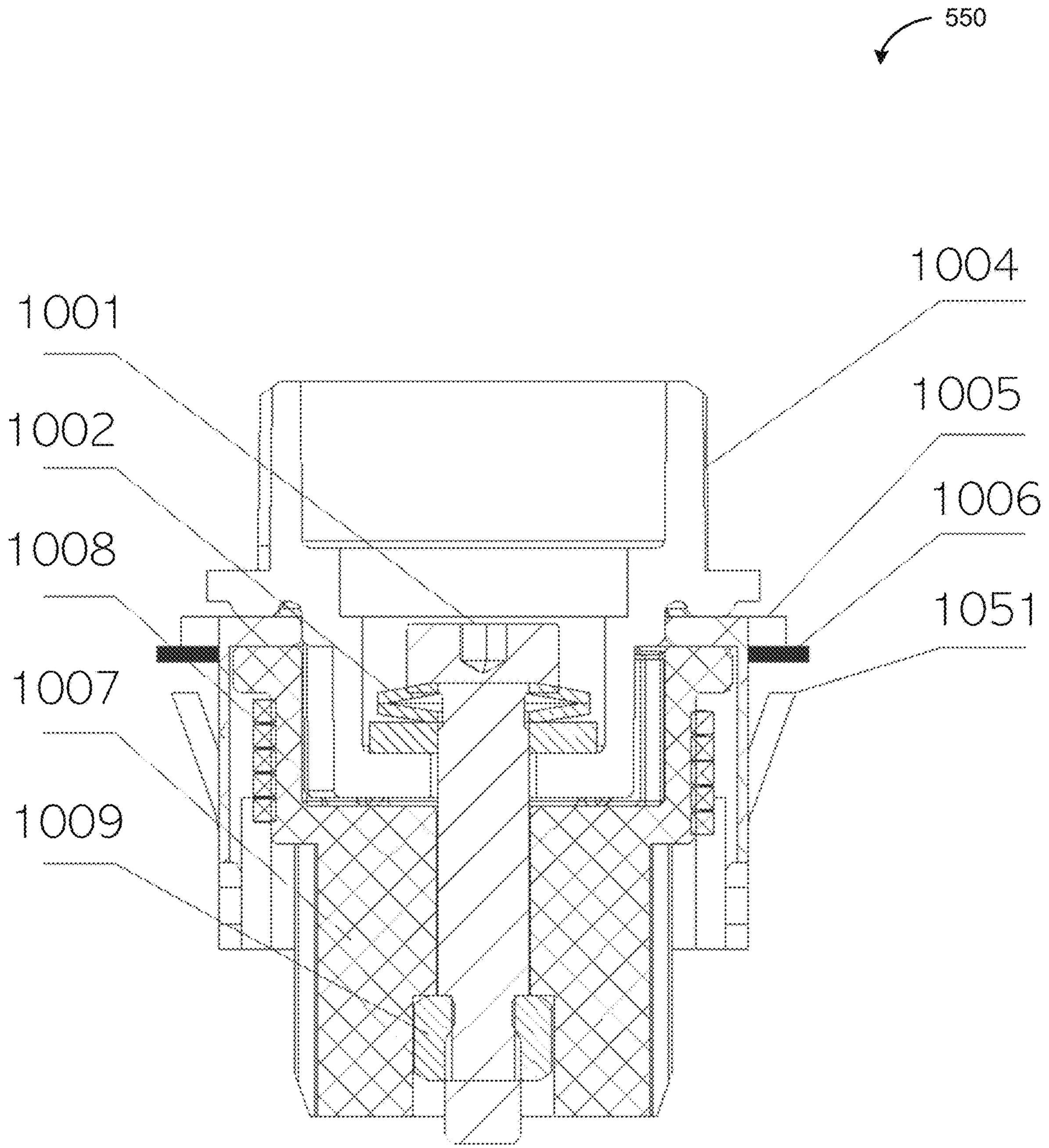
FIG. 11 illustrates a longitudinal cross-section of the example braking mechanism of FIG. 10 after being assembled, in accordance with some embodiments.
Figure 12:
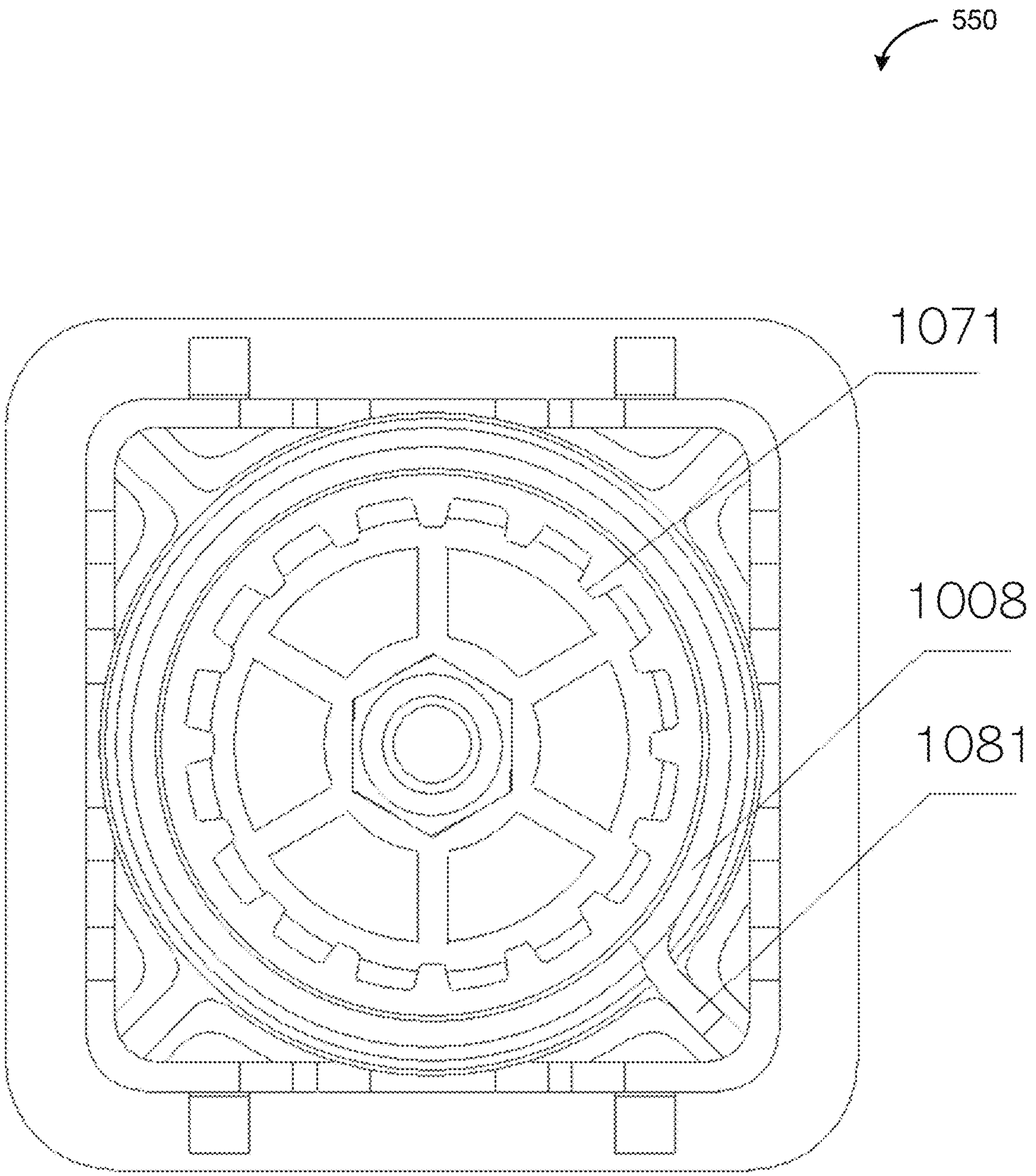
FIG. 12 illustrates a top view of the example braking mechanism of FIG. 10 after being assembled, in accordance with some embodiments.

FIG. 10 illustrates an exploded view of an example braking mechanism 550, FIG. 11 illustrates a longitudinal cross-section of the example braking mechanism 550 after being assembled, and FIG. 12 illustrates a top view of the example braking mechanism 550 after being assembled, in accordance with some embodiments. As shown in FIGS. 10-12, the example braking mechanism 550 comprises a first connecting component 1004, a mounting seat 1005, and a second connecting component 1007. A portion of the first connecting component 1004 is inserted into the mounting seat 1005 and connects to the second connecting component 1007. The example braking mechanism 550 further includes a fastening screw 1001, an elastic component 1002, a washer 1003, a rubber pad 1006, and a nut 1009. The nut 1009 is positioned inside the second connecting component 1007. The fastening screw 1001 passes through the elastic component 1002, the washer 1003, the first connecting component 1004, the mounting seat 1005, and the second connecting component 1007 in sequence, and is fixed to the nut 1009, forming an integrated structure. The integrated structure is installed into a housing 1121 at an end of a lifting column. Moreover, the clastic component 1002 includes a disc spring, a wave spring, an elastic washer, and/or other types. The elastic component 1002 is positioned between the fastening screw 1001 and the first connecting component 1004. The washer 1003 is positioned between the elastic component 1002 and the first connecting component 1004. Furthermore, the mounting seat 1005 of the example braking mechanism 550 is identical to that of the example braking mechanism 540. The first connecting component 1004 and the second connecting component 1007 of the example braking mechanism 550 are identical to those of the example braking mechanism 540.

Figure 13:
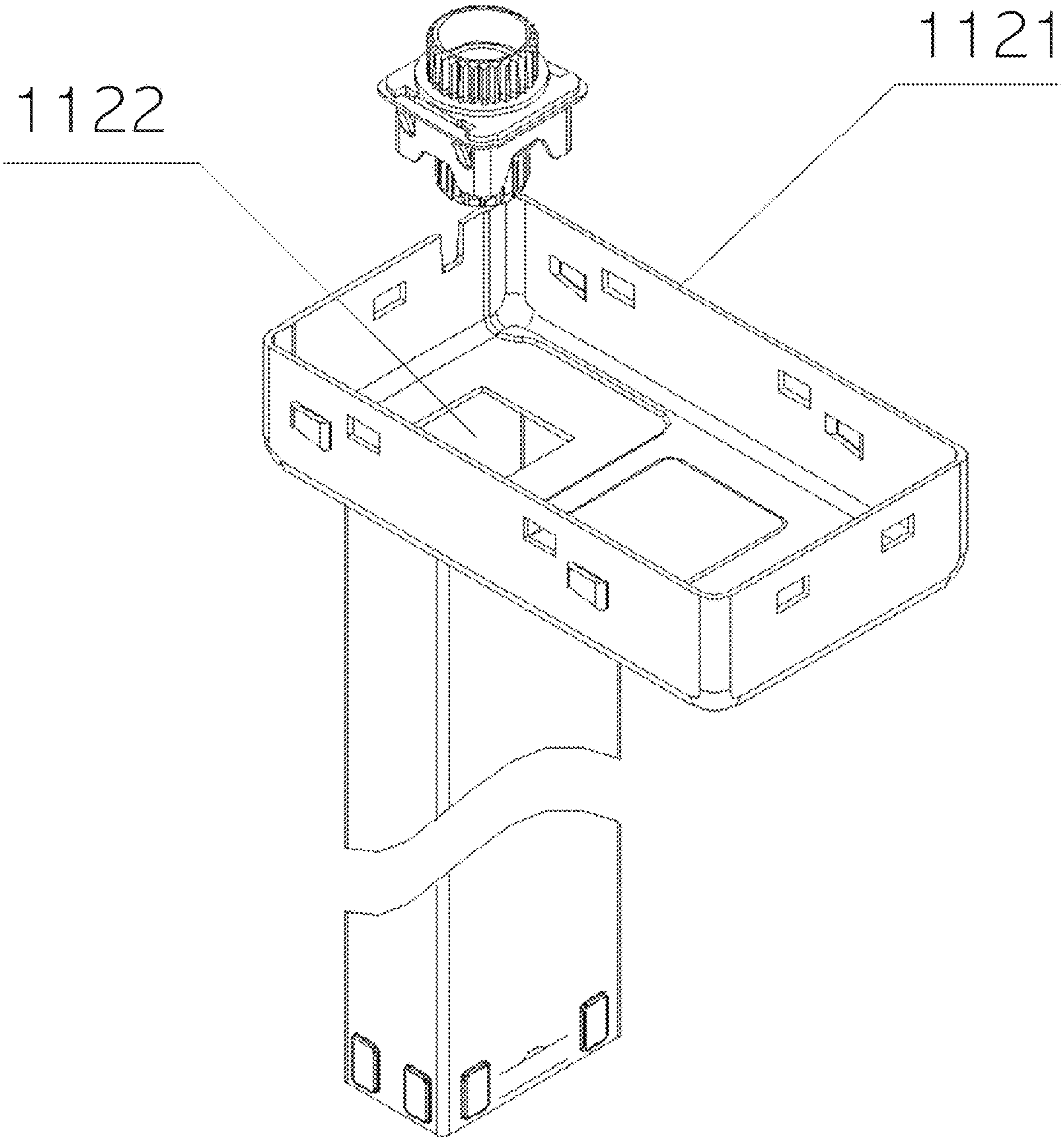
FIG. 13 is a schematic diagram illustrating an installation of the example braking mechanism of FIG. 10 into a corresponding housing of a driving unit of a lifting column, in accordance with some embodiments.

FIG. 13 is a schematic diagram illustrating an installation of the example braking mechanism 540 or the example braking mechanism 550 into the housing 1121 of a driving unit of a lifting column, in accordance with some embodiments. As shown in FIG. 7, the housing 1121 includes an assembly hole 1122 that is adapted to connect to an outer contour shape of the plurality of peripheral walls 1053. After the snap-fits 1051 are compressed and inserted into the assembly hole 1122, the snap-fits 1051 are reset and clamped with the housing 1121, such that the housing 1121 is fixed between the snap-fits 1051 and the outwardly protruding edges 1052 of the mounting seat 1005. This configuration allows for an easy and quick installation of the mounting seat 1005 and the housing 1121. Compared to other methods such as welding or screw connections, this assembly process is simpler and saves time and effort. In some embodiments, the rubber pad 1006 (e.g., the example braking mechanism 550 in reference to FIG. 10) is positioned between the outwardly protruding edges 1052 and the housing 1121. The rubber pad 1006 contacts lower surfaces of the outwardly protruding edges 1052. This configuration provides a flexible connection for reducing vibrations and suppressing noises. In particular, this configuration isolates vibrations from a drive motor 1011, which prevents the vibrations from being transmitted to the lifting column.

Figure 14:
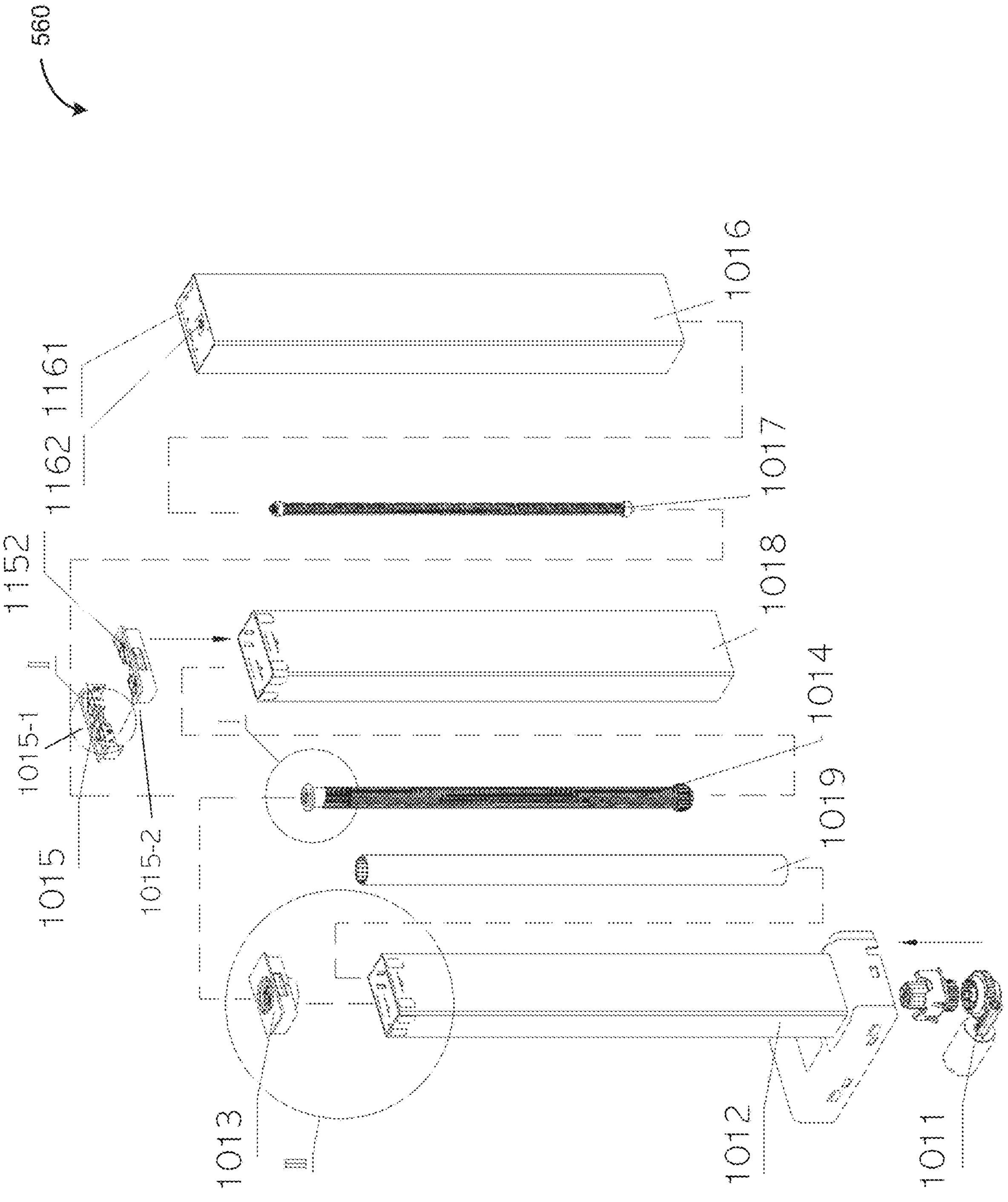
FIG. 14 is a schematic diagram illustrating an example lifting column, in accordance with some embodiments.
Figure 15:
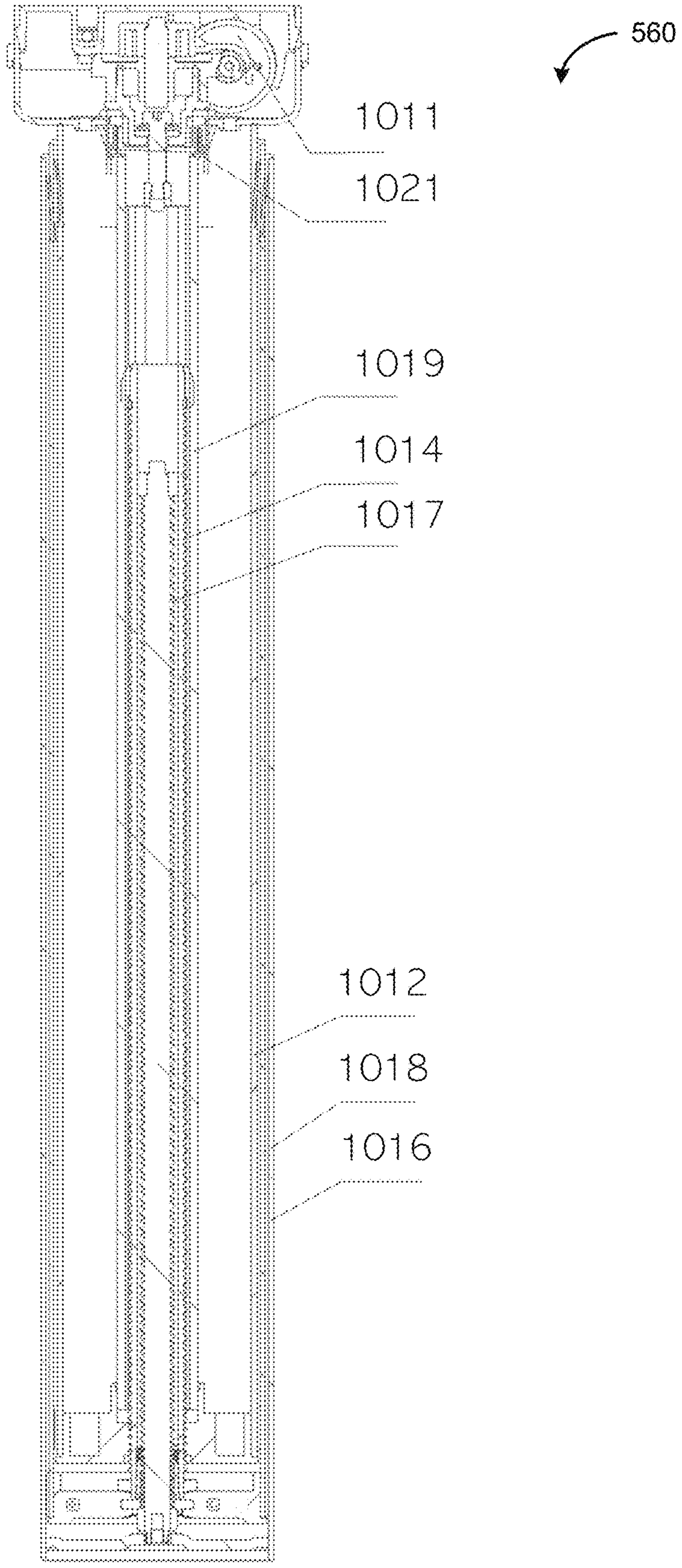
FIG. 15 illustrates a longitudinal cross-section of the example lifting column of FIG. 14 after being assembled, in accordance with some embodiments.

FIG. 14 is a schematic diagram illustrating an example lifting column 560, and FIG. 15 illustrates a longitudinal cross-section of the example lifting column 560 after being assembled, in accordance with some embodiments. As shown in FIGS. 14 and 15, a lifting column comprises an inner tube assembly 1012, an intermediate tube assembly 1018, an outer tube assembly 1016, and a driving tube 1019 arranged in a nested configuration. The lifting column further includes a housing 1121 that positions a driving unit. An end of the inner tube assembly 1012 is fixed to the housing. A drive motor 1011 and a transmission mechanism are located within the housing 1121. A braking mechanism (e.g., the example braking mechanism 540 or the example braking mechanism 550) is located within the housing. Moreover, the transmission mechanism is connected to the first connecting component 1004 of the braking mechanism. The driving tube 1019 has a non-circular fit with the second connecting component 1007 of the braking mechanism, and the driving tube 1019 is inserted into the inner tube assembly 1012. A hollow threaded rod assembly 1014 and a solid threaded rod assembly 1017 are positioned within the intermediate tube assembly 18 and the outer tube assembly 1016, respectively. In particular, the outer tube assembly 1016 includes an end having a fixed plate 1161. The fixed plate 1161 includes a spline hole 1162. The solid threaded rod assembly 1017 includes an end having a spline that is adapted to connect to the spline hole 1162 of the fixed plate 1161, such that the end of the solid threaded rod assembly 1017 is fixed to the fixed plate 1161. In reference to FIG. 9, the second connecting component 1007 includes an end having the spline head 1071. The driving tube 1019 includes an end having an internal spline adapted to connect to the spline head 1071. In some embodiments, implementing the example braking mechanism 550 is a preferred option.

In some embodiments, a hollow screw nut 1013 is installed at a tube opening of the inner tube assembly 1012, and the hollow screw nut is threadedly mounted on the hollow threaded rod assembly 1014.

Figure 16:
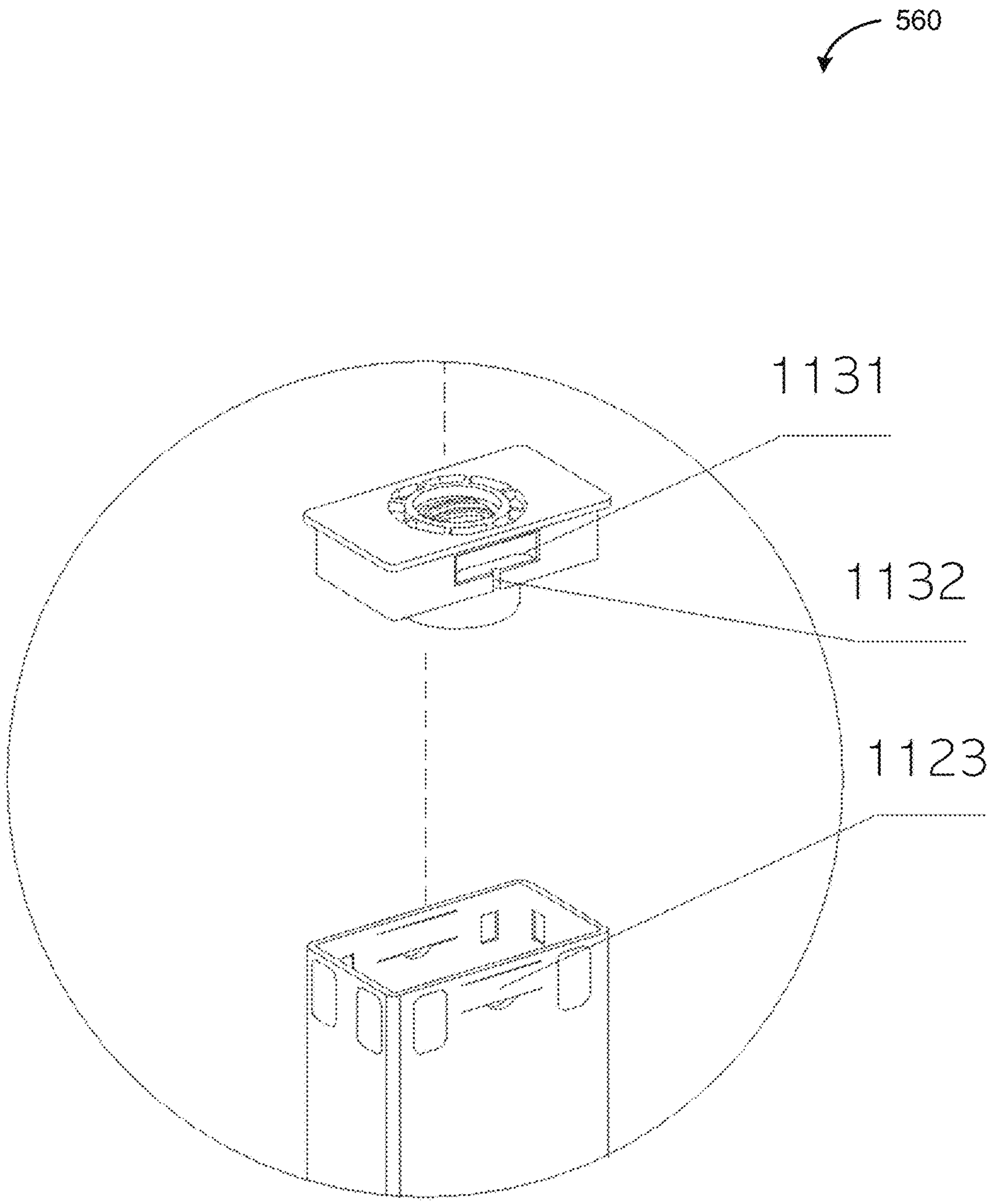
FIG. 16 is an enlarged schematic diagram of a structure at position III in reference to FIG. 14, in accordance with some embodiments.
Figure 17:
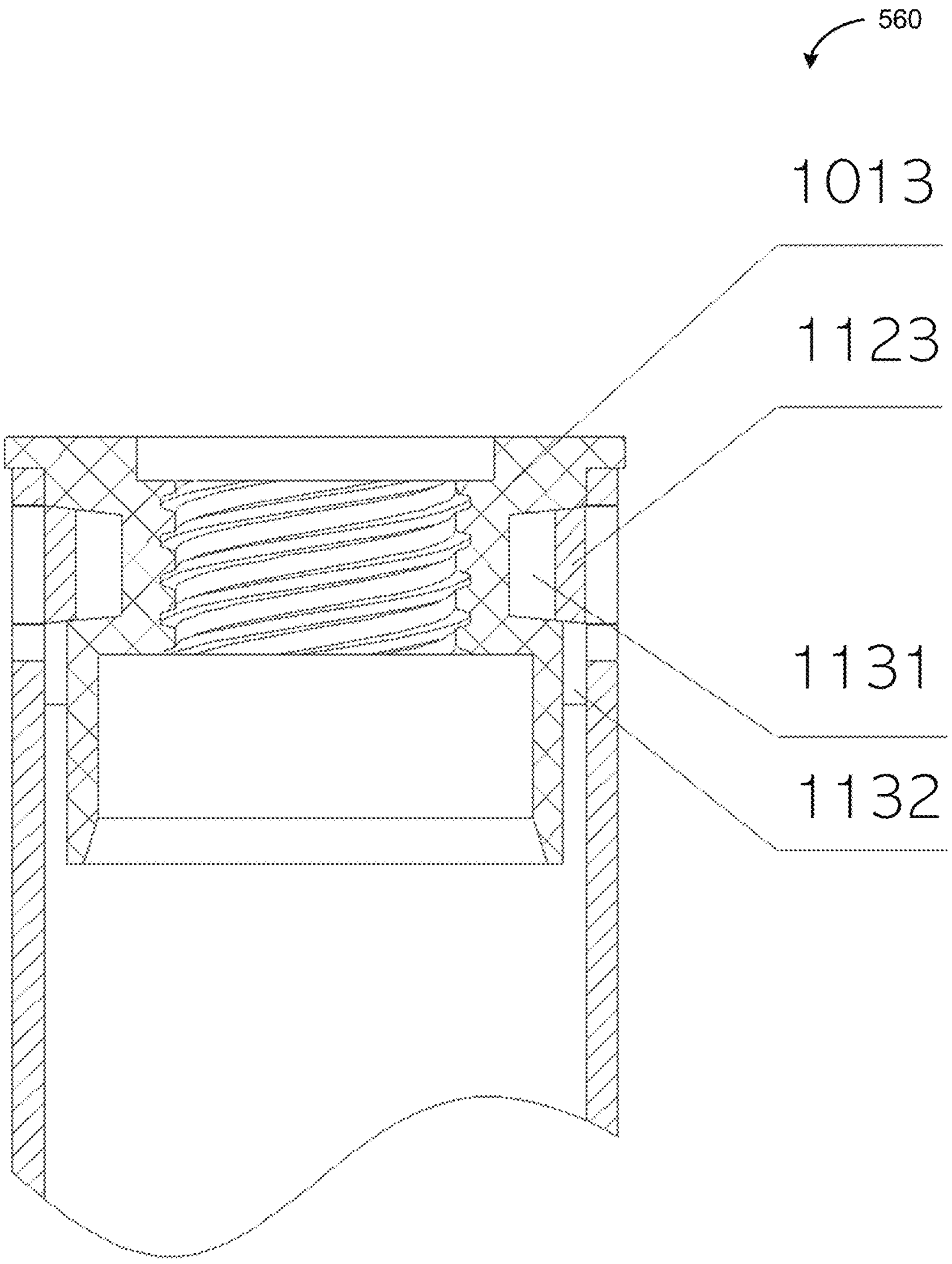
FIG. 17 illustrates a cross-section of an inner tube assembly and a hollow screw nut of FIG. 16 after being assembled, in accordance with some embodiments.

FIG. 16 is an enlarged schematic diagram of a structure at position III in reference to FIG. 14, and FIG. 17 illustrates a cross-section of the inner tube assembly 1012 and the hollow screw nut 1013 of FIG. 16 after being assembled, in accordance with some embodiments. As shown in FIGS. 16 and 17, the hollow screw nut 1013 includes a square groove 1131. A rivet 1123 is positioned corresponding to the square groove 1131 of the hollow screw nut 1013. Additionally, the hollow screw nut 1013 includes, below the square groove 1131 of the hollow screw nut 1013, a recess 1132.

Figure 18:
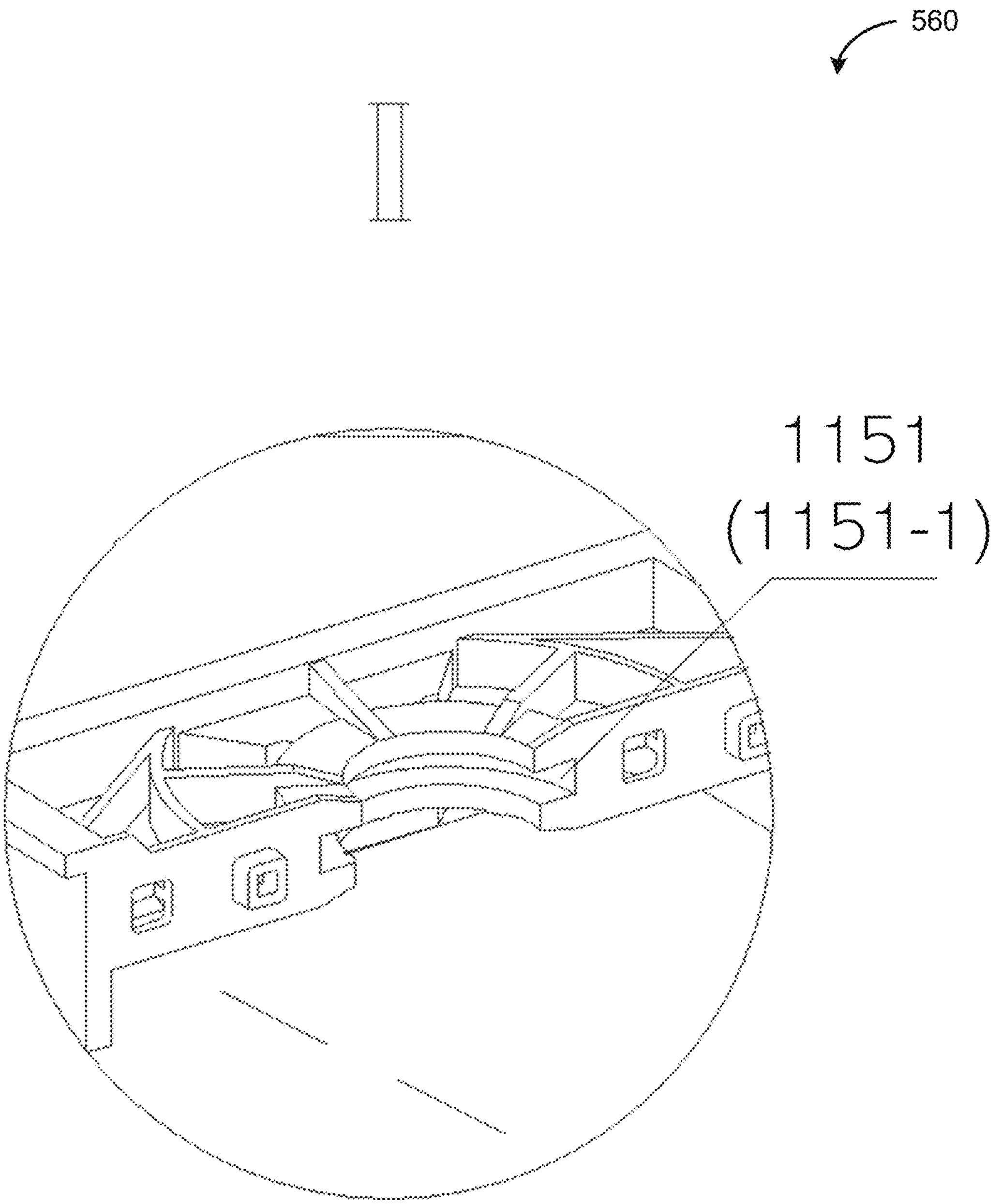
FIG. 18 is an enlarged schematic diagram of a structure at position II in reference to FIG. 14, in accordance with some embodiments.
Figure 19:
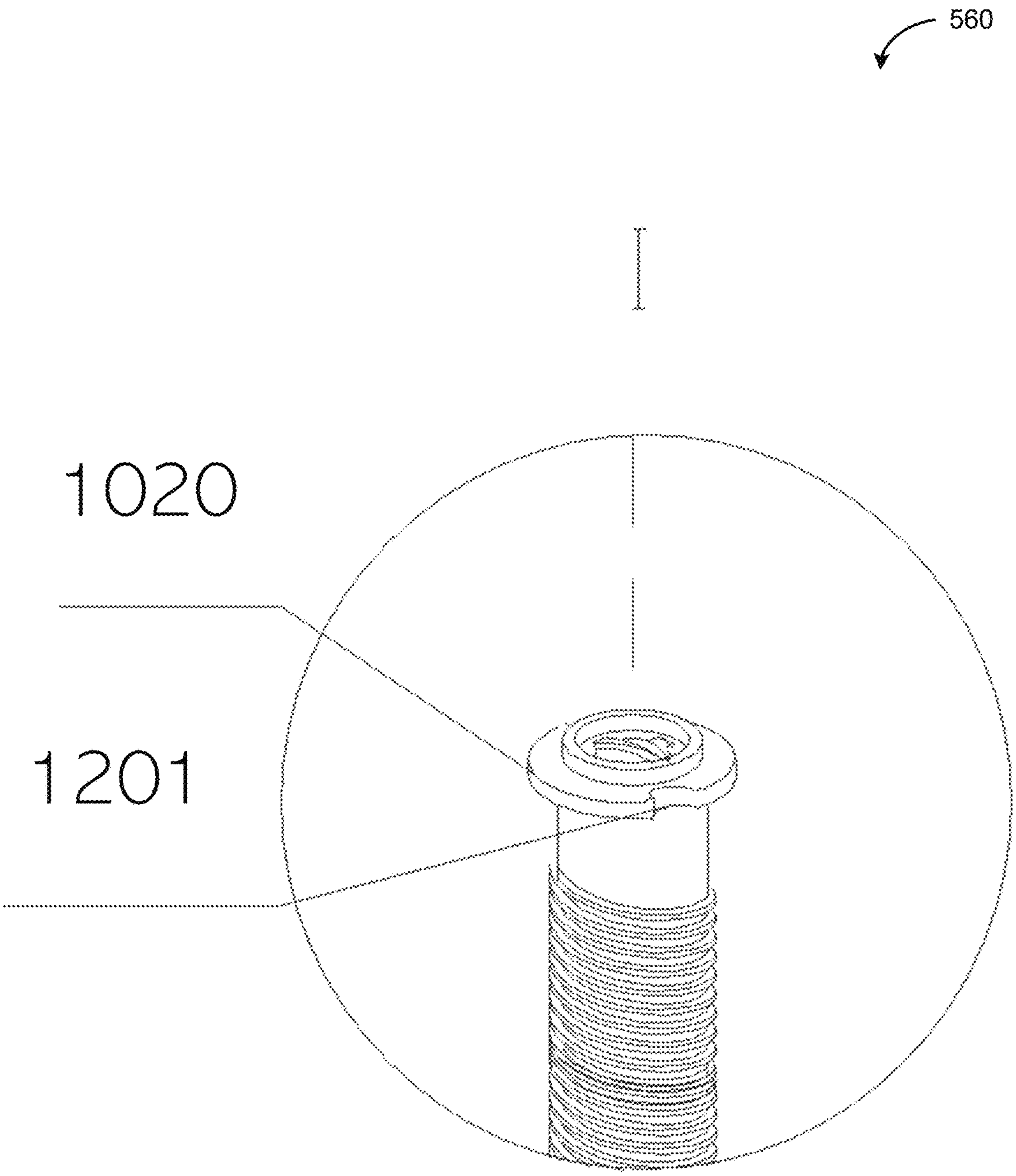
FIG. 19 is an enlarged schematic diagram of a structure at position I in reference to FIG. 14, in accordance with some embodiments.

FIG. 18 is an enlarged schematic diagram of a structure at position II in reference to FIG. 14, and FIG. 19 is an enlarged schematic diagram of a structure at position I in reference to FIG. 14, in accordance with some embodiments. As shown in FIG. 18, the hollow threaded rod assembly 1014 includes an end having a solid screw nut 1020. The solid threaded rod assembly 1017 is positioned inside the hollow threaded rod assembly 1014, and the solid threaded rod assembly is threadedly adapted to connect to the solid screw nut 1020. Moreover, an outer peripheral surface of the solid screw nut 1020 is circular, and a Hafner box is adapted to connect to the outer peripheral surface of the solid screw nut 1020. As shown in FIGS. 14 and 19, the Hafner box includes Hafner components 1015 (e.g., a first Hafner component 1015-1 and a second Hafner component 1015-2) joined together. Each of the Hafner components 1015 is block-shaped and has a semi-circular inner surface. Furthermore, the solid screw nut 1020 includes an outer peripheral surface having at least one oil reservoir groove 1201. The semi-circular inner surface of each of the Hafner components 1015 includes an oil reservoir half-ring 1151 (e.g., a first oil reservoir half-ring 1151-1 and a second oil reservoir half-ring 1151-2; the second oil reservoir half-ring 1151-2 is not shown in FIG. 18). When the oil reservoir half-rings 1151 of the Hafner components 1015 are assembled, a ring cavity is formed for accommodating the solid screw nut 1020. Additionally, the Hafner box includes an outer wall having a groove 1152. A rivet is positioned corresponding to the groove 1152 of the Hafner box at a tube opening of the intermediate tube assembly 1018.

In some embodiments, the example braking mechanism 550 is installed and undergoes torque testing. A respective braking mechanism (e.g., the example braking mechanism 550) that passes the torque testing is used for installation into the housing 1121 of the driving unit of the lifting column (e.g., the example lifting column 560). When the respective braking mechanism is continuously pressed into the assembly hole 1122 of the housing 1121, the snap-fits 1051 are deformed. After the respective braking mechanism is properly installed and positioned, the snap-fits 1051 pop out, such that the snap-fits 1051 are reset and clamped with the housing 1121, which completes the assembly of the respective braking mechanism.

In some embodiments, during the assembly of the respective braking mechanism (e.g., the example braking mechanism 550), the driving tube 1019 is inserted from an end of the inner tube assembly 1012, and makes the hollow screw nut 1013 being fixed to the tube opening of the inner tube assembly 1012. This is accomplished by applying an adaption between the internal spline at an end of the driving tube 1019 and the spline head 1071 of the second connecting component 1007 and stamping the rivet 1123 at the tube opening of the inner tube assembly 1012. Moreover, the hollow threaded rod assembly 1014 is inserted into the intermediate tube assembly 1018 for positioning the Hafner box, which connects to the hollow threaded rod assembly 1014, at the tube opening of the intermediate tube assembly 1018. This is accomplished by connecting the solid screw nut 1020, which is at an end of the hollow threaded rod assembly 1014, to the Hafner box and stamping the rivet at the tube opening of the intermediate tube assembly 1018. Furthermore, an end of the solid threaded rod assembly 1017 is fixed to the fixed plate 1161 at an end of the outer tube assembly 1016. The solid threaded rod assembly 1017 and the outer tube assembly 1016 remain stationary relative to each other. Additionally, the solid threaded rod assembly 1017 is installed into the hollow threaded rod assembly 1014 through the solid screw nut 1020, and the hollow threaded rod assembly 1014 is installed into the driving tube 1019 through the hollow screw nut 1013.

In some embodiments, when the lifting column (e.g., the example lifting column 560) is raised, the drive motor 1011 is turned on and drives the transmission mechanism to rotate, which in turn makes the respective braking mechanism to rotate and further drives the driving tube 1019 to rotate. Because of an adaption between internal threads of the driving tube 1019 and internal threads of the hollow threaded rod assembly 1014, the hollow threaded rod assembly 1014 rises relative to the driving tube 1019. Moreover, since an end of the hollow threaded rod assembly 1014 is fixed to the intermediate tube assembly 1018, the intermediate tube assembly 1018 rises along with the hollow threaded rod assembly 1014. When the hollow threaded rod assembly 1014 reaches to a highest position, the hollow threaded rod assembly 1014 becomes stationary relative to the driving tube 1019. In this circumstance, external threads of the solid threaded rod assembly 1017 engage with the internal threads of the hollow threaded rod assembly 1014, such that the solid threaded rod assembly 1017 rises relative to the hollow threaded rod assembly 1014. Since an end of the solid threaded rod assembly 1017 connects to the outer tube assembly 1016, the outer tube assembly 1016 rises along with the solid threaded rod assembly 1017. When the outer tube assembly 1016 reaches a desired height, the respective braking mechanism self-locks.

In some embodiments, when the lifting column is lowered, the drive motor 1011 is turned on and drives the transmission mechanism to reserve the rotation, which makes the outer tube assembly 1016 and the intermediate tube assembly 1018 lower their positions in sequence. When the outer tube assembly 1016 and/or the intermediate tube assembly 1018 reach a desired height, the respective braking mechanism self-locks.

In some embodiments, for example as shown in FIG. 15, a retaining ring 1021 is positioned between the respective braking mechanism (e.g., the example braking mechanism 550) and the driving tube 1019 for preventing axial movement of a self-locking spring (e.g., the self-locking spring 1008 of the example braking mechanism 550). This configuration ensures the self-locking function remains effective and unaffected.

Figure 20:
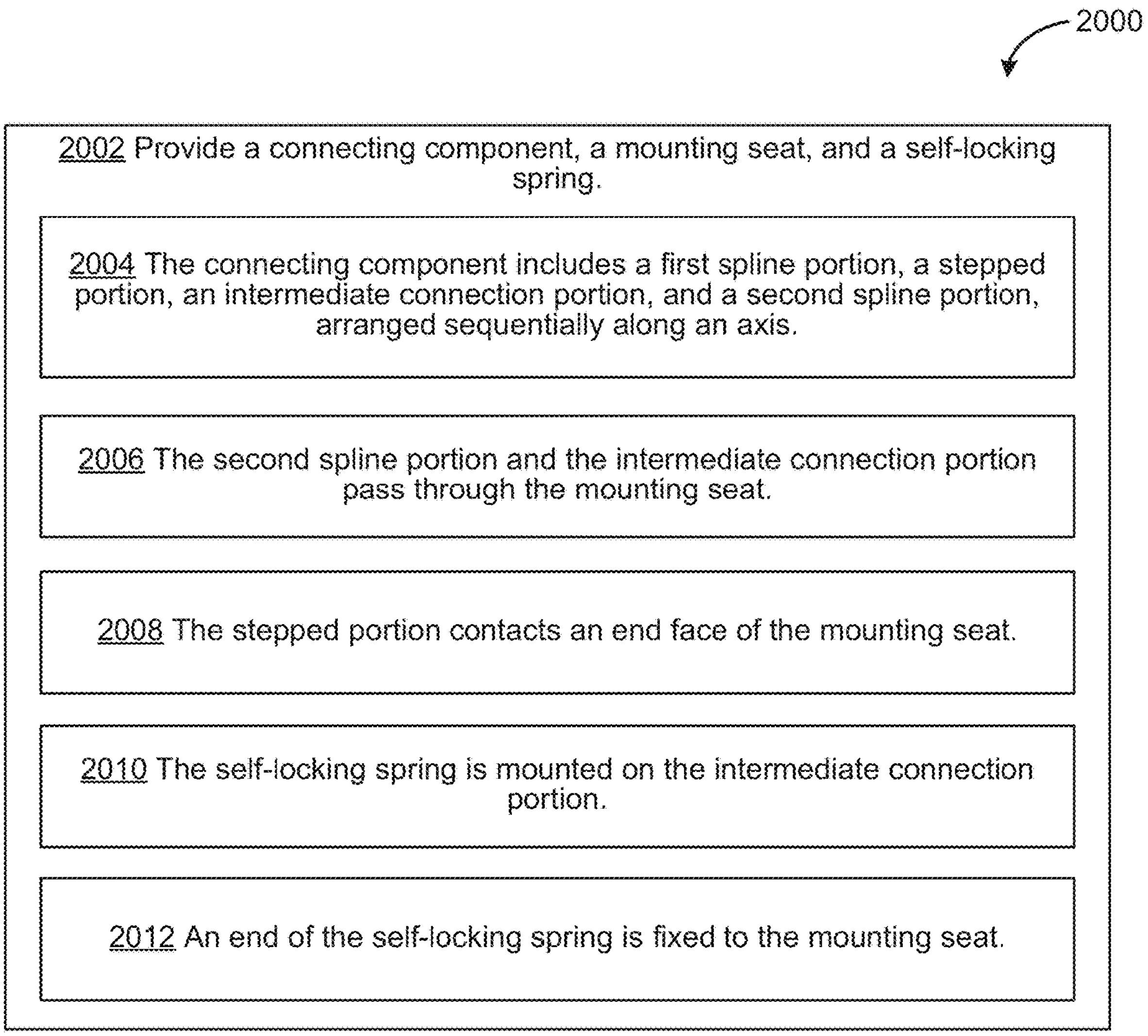
FIG. 20 is a flow diagram of an example method of providing a braking mechanism, in accordance with some embodiments.

FIG. 20 is a flow diagram of an example method 2000 of providing a braking mechanism, in accordance with some embodiments. Specifically, the flow diagram of FIG. 20 can be used to provide a braking mechanism described above in reference to FIGS. 1-19. The method of 2000 includes providing (2002) a connecting component, a mounting seat, and a self-locking spring. The connecting component includes (2004) a first spline portion, a stepped portion, an intermediate connection portion, and a second spline portion, arranged sequentially along an axis. The second spline portion and the intermediate connection portion pass (2006) through the mounting seat. The stepped portion contacts (2008) an end face of the mounting seat. The self-locking spring is mounted (2010) on the intermediate connection portion. An end of the self-locking spring is fixed (2012) to the mounting seat.

Figure 21:
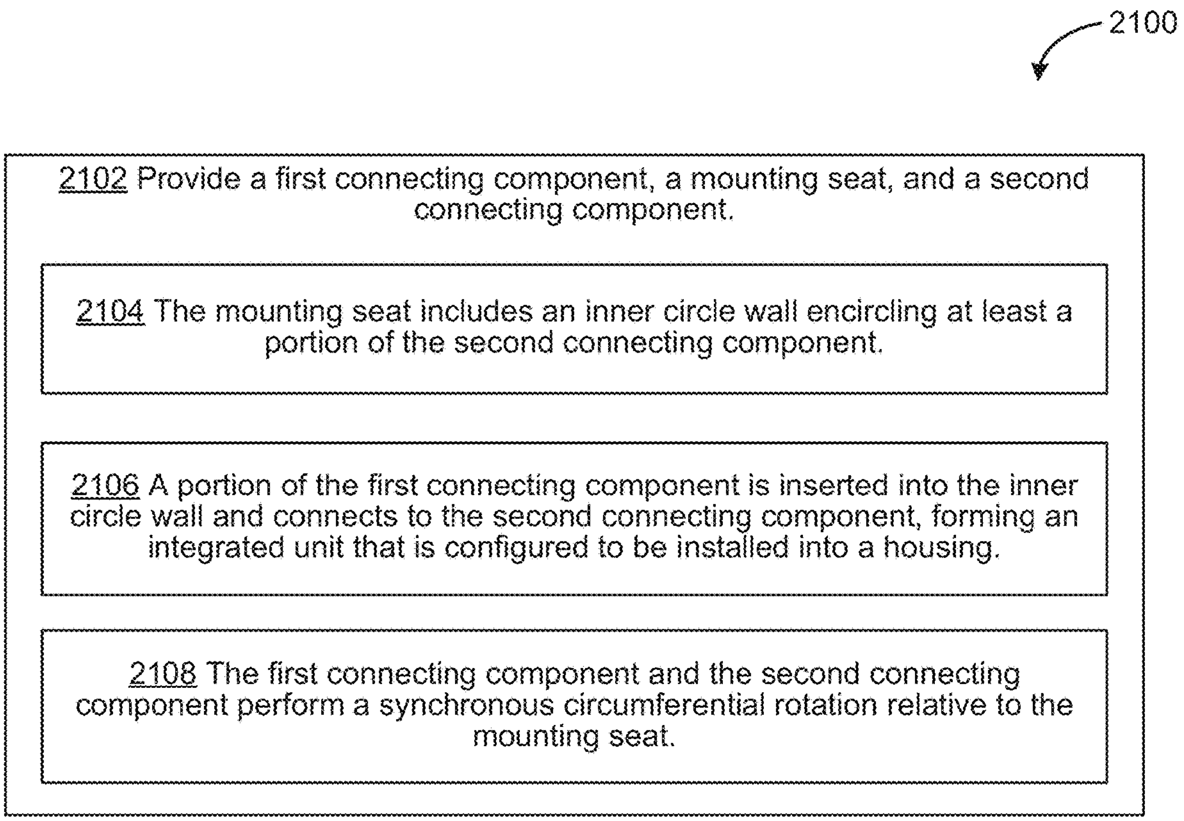
FIG. 21 is a flow diagram of an example method of providing a braking mechanism, in accordance with some embodiments.

FIG. 21 is a flow diagram of an example method 2100 of providing a braking mechanism, in accordance with some embodiments. Specifically, the flow diagram of FIG. 21 can be used to provide a braking mechanism described above in reference to FIGS. 1-19. The method of 2100 includes providing (2102) a first connecting component, a mounting seat, and a second connecting component. The mounting seat includes (2104) an inner circle wall encircling at least a portion of the second connecting component. A portion of the first connecting component is inserted (2106) into the inner circle wall and connects to the second connecting component, forming an integrated unit that is configured to be installed into a housing. The first connecting component and the second connecting component perform (2108) a synchronous circumferential rotation relative to the mounting seat.

It should be understood that the particular order in which the operations in FIGS. 25 and 26 have been described are merely exemplary and are not intended to indicate that the described order is the only order in which the operations could be performed. One of ordinary skill in the art would recognize various ways to manufacturing braking mechanisms and lifting columns as described herein. It is also noted that more details on the method of manufacturing braking mechanisms and lifting columns are explained above with reference to FIGS. 1-24. For brevity, these details are not repeated in the description herein.

It will also be understood that, although the terms first, second, etc. are, in some instances, used herein to describe various elements, these elements should not be limited by these terms. These terms are used only to distinguish one element from another. For example, a first widget could be termed a second widget, and, similarly, a second widget could be termed a first widget, without departing from the scope of the various described embodiments. The first widget and the second widget are both widgets, but they are not the same widget.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A braking mechanism, comprising:

a first connecting component, a mounting seat, and a second connecting component, wherein:

the mounting seat includes an inner circle wall encircling at least a portion of the second connecting component;

a portion of the first connecting component is inserted into the inner circle wall and connects to the second connecting component, forming an integrated unit that is configured to be installed into a housing; and the first connecting component and the second connecting component perform a synchronous circumferential rotation relative to the mounting seat;

wherein the mounting seat includes a plurality of peripheral walls, at least a first one of the plurality of peripheral walls has an outwardly protruding edge and at least a second one of the plurality of peripheral walls has a snap-fit, wherein the housing includes an assembly hole that is adapted to connect to an outer contour shape of the plurality of peripheral walls, wherein after the snap-fit is compressed and inserted into the assembly hole, the snap-fit is reset and clamped with the housing-, and wherein the braking mechanism further comprises a fastening screw, wherein:

a nut is positioned inside the second connecting component; and the fastening screw passes through the first connecting component, the mounting seat, and the second connecting component in sequence, and is fixed to the nut, forming an integrated structure.

2. The braking mechanism of claim 1, wherein:

the first connecting component includes a spline portion, a flange portion, and an external gear ring portion;

the second connecting component includes a cavity that accommodates the spline portion, wherein the cavity includes an inner wall having internal splines adapted to connect to the spline portion, and the cavity includes an edge having a flange edge; and the inner circle wall of the mounting seat contacts the flange edge and the flange portion.

3. The braking mechanism of claim 2, wherein:

the inner circle wall of the mounting seat includes an inner ring having a mounting hole, wherein:

an inner diameter of the mounting hole is greater than an outer diameter of the spline portion; and the inner diameter of the mounting hole is less than an outer diameter of the flange portion and an outer diameter of the flange edge.

4. The braking mechanism of claim 1, wherein:

an elastic component is positioned between the fastening screw and the first connecting component, the elastic component configured to provide bidirectional damping.

5. The braking mechanism of claim 4, further comprising a washer, wherein:

the washer is positioned between the elastic component and the first connecting component.

6. An assembly, comprising:

a housing; and the braking mechanism of claim 1, wherein the integrated unit is installed in the housing, wherein the mounting seat remains stationary relative to the housing.

7. The assembly of claim 6, wherein:
the braking mechanism further includes a rubber pad, the rubber pad contacting a lower surface of the outwardly protruding edge.

8. The assembly of claim 6, wherein:
a groove is formed by a space between two peripheral walls of the plurality of peripheral walls; and
a self-locking spring is positioned at an outer wall of a cylindrical section of the second connecting component, the self-locking spring including an end protruding radially outward, the end inserted into the groove.

9. The assembly of claim 8, wherein:
the self-locking spring and the second connecting component have a common central axis.

10. The assembly of claim 6, wherein: the mounting seat includes four peripheral walls, wherein:
a first two peripheral walls of the four peripheral walls are opposite to each other and the first two peripheral walls include outwardly protruding edges positioned on top edges of the two of the four peripheral walls; and
a second two peripheral walls of the four peripheral walls are opposite to each other and the second two peripheral walls include snap-fits.

11. The assembly of claim 10, wherein:
the second two peripheral walls that have the snap-fits include clearance holes, and the snap-fits are positioned obliquely upward along bottom edges of the clearance holes; and
after the snap-fits are compressed into the clearance holes, the snap-fits are reset and clamp the mounting seat to the housing.

12. A lifting column, comprising:
a housing;
an inner tube assembly, an intermediate tube assembly, an outer tube assembly, and a driving tube arranged in a nested configuration, an end of the inner tube assembly fixed to the housing;
a drive motor and a transmission mechanism located within the housing; and
the braking mechanism of claim 1 located within the housing, wherein:
the transmission mechanism is connected to the first connecting component of the braking mechanism;
the driving tube has a non-circular fit with the second connecting component of the braking mechanism, and the driving tube is inserted into the inner tube assembly; and
a hollow threaded rod assembly and a solid threaded rod assembly are positioned within the intermediate tube assembly and the outer tube assembly, respectively.

13. The lifting column of claim 12, wherein:
the second connecting component includes an end having a spline head; and
the driving tube includes an end having an internal spline adapted to connect to the spline head.

14. The lifting column of claim 12, wherein:
the outer tube assembly includes an end having a fixed plate;
the solid threaded rod assembly includes an end that is fixed to the fixed plate; and
the fixed plate includes a spline hole, the solid threaded rod assembly is inserted into the outer tube assembly, and the end of the solid threaded rod assembly includes a spline adapted to connect to the spline hole.

15. The lifting column of claim 12, wherein:
the braking mechanism includes a self-locking spring positioned radially outward of a cylindrical outer wall of the second connecting component, the self-locking spring including an end protruding radially outward, the end inserted into a groove formed by a space between two peripheral walls included in the mounting seat; and
a retaining ring is positioned between the braking mechanism and the driving tube for preventing axial movement of the self-locking spring.

16. The lifting column of claim 12, wherein:
a hollow screw nut is installed at a tube opening of the inner tube assembly, and the hollow screw nut is threadedly mounted on the hollow threaded rod assembly.

17. The lifting column of claim 16, wherein:
the hollow screw nut includes a square groove; and
a rivet is positioned corresponding to the square groove of the hollow screw nut.

18. The lifting column of claim 17, wherein:
the hollow screw nut includes, below the square groove of the hollow screw nut, a recess.

19. The lifting column of claim 12, wherein:
the hollow threaded rod assembly includes an end having a solid screw nut; and
the solid threaded rod assembly is positioned inside the hollow threaded rod assembly, and the solid threaded rod assembly is threadedly adapted to connect to the solid screw nut.

20. The lifting column of claim 19, wherein:
an outer peripheral surface of the solid screw nut is circular, and a Hafner box is adapted to connect to the outer peripheral surface of the solid screw nut; and
the Hafner box includes a first Hafner component and a second Hafner component joined together, and each of the first and second Hafner components is block-shaped and has a semi-circular inner surface.

21. The lifting column of claim 20, wherein:
the solid screw nut includes an outer peripheral surface having at least one oil reservoir groove;
the semi-circular inner surface of each of the first and second Hafner components includes an oil reservoir half-ring; and
when the oil reservoir half-rings of the first and second Hafner components are assembled, a ring cavity is formed for accommodating the solid screw nut.

22. The lifting column of claim 21, wherein:
the Hafner box includes an outer wall having a groove; and
a rivet is positioned corresponding to the groove of the Hafner box.

* * * * *